(12) United States Patent
Nakamura et al.

(10) Patent No.: US 8,862,478 B2
(45) Date of Patent: Oct. 14, 2014

(54) SPEECH TRANSLATION SYSTEM, FIRST TERMINAL APPARATUS, SPEECH RECOGNITION SERVER, TRANSLATION SERVER, AND SPEECH SYNTHESIS SERVER

(75) Inventors: Satoshi Nakamura, Koganei (JP); Eiichiro Sumita, Koganei (JP); Yutaka Ashikari, Koganei (JP); Noriyuki Kimura, Koganei (JP); Chiori Hori, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 327 days.

(21) Appl. No.: 13/499,311

(22) PCT Filed: Mar. 3, 2010

(86) PCT No.: PCT/JP2010/053419
§ 371 (c)(1),
(2), (4) Date: Apr. 16, 2012

(87) PCT Pub. No.: WO2011/040056
PCT Pub. Date: Apr. 7, 2011

(65) Prior Publication Data
US 2012/0197629 A1      Aug. 2, 2012

(30) Foreign Application Priority Data

Oct. 2, 2009   (JP) ................................. 2009-230442

(51) Int. Cl.
*G10L 21/00*    (2013.01)
*G10L 25/00*    (2013.01)
*G10L 13/04*    (2013.01)
*G06F 17/28*    (2006.01)
*G10L 15/26*    (2006.01)
*G10L 15/30*    (2013.01)

(52) U.S. Cl.
CPC ............. *G10L 15/265* (2013.01); *G10L 13/043* (2013.01); *G06F 17/289* (2013.01); *G10L 15/30* (2013.01)
USPC ................... 704/277; 704/2; 704/3; 704/231; 704/258

(58) Field of Classification Search
CPC ............................. G06F 17/289; G10L 13/043
USPC .................. 704/2–8, 231, 258, 260, 266, 277
See application file for complete search history.

(56) References Cited

U.S. PATENT DOCUMENTS 6,052,657 A * 4/2000 Yamron et al. ..................... 704/9
6,266,642 B1 * 7/2001 Franz et al. .................... 704/277

(Continued)

FOREIGN PATENT DOCUMENTS
JP      2000-148176 A    5/2000
JP      2002-311983 A    10/2002

(Continued)

OTHER PUBLICATIONS

Office Action from Japanese Patent App. No. 2011-534094 (Jan. 21, 2014) with partial English language translation thereof.

(Continued)

*Primary Examiner* — Shaun Roberts
(74) *Attorney, Agent, or Firm* — Cermak Nakajima McGowan LLP; Tomoko Nakajima

(57) ABSTRACT

In conventional network-type speech translation systems, devices or models for recognizing or synthesizing speech cannot be changed in accordance with speakers' attributes, and therefore, accuracy is reduced or inappropriate output occurs in each process of speech recognition, translation, and speech synthesis. Accuracy of each processing of speech translation, translation, or speech synthesis is improved and appropriate output is performed in a network-type speech translation system by, based on speaker attributes, appropriately changing the server to perform speech recognition or the speech recognition model, appropriately changing the translation server to perform translation or the translation model, or appropriately changing the speech synthesis server or speech synthesis model.

14 Claims, 33 Drawing Sheets

(56) References Cited

U.S. PATENT DOCUMENTS

| | | | |
|---|---|---|---|
| 6,996,525 B2* | 2/2006 | Bennett et al. | 704/231 |
| 7,219,050 B2* | 5/2007 | Ishikawa et al. | 704/3 |
| 7,228,275 B1* | 6/2007 | Endo et al. | 704/235 |
| 7,624,013 B2* | 11/2009 | Barker | 704/251 |
| 7,702,510 B2 | 4/2010 | Eide et al. | 704/260 |
| 7,881,928 B2* | 2/2011 | Gao et al. | 704/231 |
| 8,036,893 B2* | 10/2011 | Reich | 704/257 |
| 8,145,472 B2* | 3/2012 | Shore et al. | 704/2 |
| 8,386,235 B2* | 2/2013 | Duan | 704/5 |
| 8,515,749 B2* | 8/2013 | Stallard | 704/235 |
| 2002/0095295 A1* | 7/2002 | Cohen et al. | 704/275 |
| 2002/0128840 A1* | 9/2002 | Hinde et al. | 704/258 |
| 2008/0077386 A1* | 3/2008 | Gao et al. | 704/3 |
| 2008/0262828 A1 | 10/2008 | Och et al. | |
| 2010/0185434 A1* | 7/2010 | Burvall et al. | 704/3 |

FOREIGN PATENT DOCUMENTS

| | | | |
|---|---|---|---|
| JP | 2003-058458 A | | 2/2003 |
| JP | 2004-048277 A | | 2/2004 |
| JP | 2005-031758 A | | 2/2005 |
| JP | 2005-140988 A | | 6/2005 |
| JP | 2006-099296 A | | 4/2006 |
| JP | 2006-215315 A | | 8/2006 |
| JP | 2008-243080 A | | 10/2008 |
| JP | 2009-140503 A | | 6/2009 |
| JP | 2009-527818 A | | 7/2009 |
| WO | WO2005/048509 | * | 5/2005 |
| WO | WO2007/098055 A2 | | 8/2007 |

OTHER PUBLICATIONS

International Search Report for PCT Patent App. No. PCT/JP2010/053419 (May 18, 2010).

* cited by examiner

FIG.11

| Gender | Female |
|---|---|
| Age | 37 years old |
| Language in use | Japanese |
| Native | yes |

FIG.12

| Gender | Male |
|---|---|
| Age | 38 years old |
| Language in use | English |
| Native | yes |

FIG.13

| ID | Language | Speaker attribute | | ... | Speech recognition server identifier |
|---|---|---|---|---|---|
| | | Gender | Age | | |
| 1 | Japanese | Male | 0-9 years old | ... | 254.221.21.39 |
| | | | 10-19 years old | ... | |
| 2 | Japanese | Male | 20-29 years old | ... | 254.221.29.128 |
| | | | 30-39 years old | ... | |
| | | | 40-49 years old | ... | |
| 3 | Japanese | Male | 50-59 years old | ... | 254.221.38.209 |
| | | | 60-69 years old | ... | |
| | | | 70 years old or older | ... | |
| 4 | Japanese | Female | 0-9 years old | ... | 186.221.57.88 |
| 5 | Japanese | Female | 10-19 years old | ... | 186.221.58.129 |
| 6 | Japanese | Female | 20-29 years old | ... | 186.221.99.198 |
| 7 | Japanese | Female | 30-39 years old | ... | 186.221.1.27 |
| ⋮ | ⋮ | ⋮ | ⋮ | ⋮ | ⋮ |
| 32 | English | Male | 0-9 years old | ... | 98.55.30.221 |
| 33 | English | Male | 10-19 years old | ... | 98.55.77.125 |
| 34 | English | Male | 20-29 years old | ... | 98.55.208.120 |
| 35 | English | Male | 30-39 years old | ... | 98.55.173.217 |
| ⋮ | ⋮ | ⋮ | ⋮ | ⋮ | ⋮ |

FIG.14

| ID | Speaker attribute ||||| Speech recognition model identifier |
|---|---|---|---|---|---|---|
| | Language | Gender | Age | Speaking speed | ... | |
| ... | ... | ... | ... | ... | ... | ... |
| 17 | Japanese | Female | 30-39 years old | Fast | ... | JR5 |
| 18 | Japanese | Female | 30-39 years old | Middle | ... | JR6 |
| 19 | Japanese | Female | 30-39 years old | Slow | ... | JR7 |
| 20 | Japanese | Female | 40-49 years old | Fast | ... | JR8 |
| ... | ... | ... | ... | ... | ... | ... |
| 39 | English | Male | 30-39 years old | Fast | ... | ER3 |
| 40 | English | Male | 30-39 years old | Middle | ... | ER4 |
| 41 | English | Male | 30-39 years old | Slow | ... | ER5 |
| 42 | English | Male | 40-49 years old | Fast | ... | ER6 |
| ... | ... | ... | ... | ... | ... | ... |

FIG.15

| ID | Source language | Target language | Speaker attribute | | | | | Translation server identifier |
|---|---|---|---|---|---|---|---|---|
| | | | Gender | Age | First speaker class | | ... | |
| ...... | ...... | ...... | ...... | ...... | ...... | ..... | ...... | ...... |
| 25 | Japanese | English | Female | 30-39 years old | A | ..... | | 77.128.50.80 |
| 26 | Japanese | English | Female | 30-39 years old | B | ..... | | 77.128.55.58 |
| 27 | Japanese | English | Female | 30-39 years old | C | ..... | | 77.128.29.107 |
| ...... | ...... | ...... | ...... | ...... | ...... | ..... | | ...... |
| 38 | English | Japanese | Male | 30-39 years old | A | ..... | | 187.25.30.8 |
| 39 | English | Japanese | Male | 30-39 years old | B | ..... | | 187.25.38.29 |
| 40 | English | Japanese | Male | 30-39 years old | C | ..... | | 187.25.58.227 |
| ...... | ...... | ...... | ...... | ...... | ...... | ..... | | ...... |

FIG.16

| ID | Source language | Speaker attribute ||| Translation model identifier |
|---|---|---|---|---|---|
| | | Gender | Age | Second speaker class | |
| ...... | ...... | ...... | ...... | ...... | ...... |
| 17 | Japanese | Female | 20-29 years old | N | JT3 |
| 18 | Japanese | Female | 30-39 years old | Y | JT4 |
| 19 | Japanese | Female | 30-39 years old | N | JT5 |
| 20 | Japanese | Female | 40-49 years old | Y | JT6 |
| ...... | ...... | ...... | ...... | ...... | ...... |
| 39 | English | Male | 20-29 years old | N | ET6 |
| 40 | English | Male | 30-39 years old | Y | ET7 |
| 41 | English | Male | 30-39 years old | N | ET8 |
| 42 | English | Male | 40-49 years old | Y | ET9 |
| ...... | ...... | ...... | ...... | ...... | ...... |

FIG.17

| ID | Target language | Speaker attribute ||||| | Speech synthesis server identifier |
|---|---|---|---|---|---|---|---|---|
| | | Gender | Age | Speaking speed | First speaker class | Second speaker class | ...... | |
| ...... | ...... | ...... | ...... | ...... | ...... | ...... | ...... | ...... |
| 33 | English | Female | 30-39 years old | Middle | A | Y | ...... | 238.3.55.7 |
| 34 | English | Female | 30-39 years old | Middle | A | N | ...... | 238.3.88.101 |
| 35 | English | Female | 30-39 years old | Middle | B | Y | ...... | 238.3.89.51 |
| ...... | ...... | ...... | ...... | ...... | ...... | ...... | ...... | ...... |
| 58 | Japanese | Male | 30-39 years old | Fast | A | Y | ...... | 239.52.7.51 |
| 59 | Japanese | Male | 30-39 years old | Fast | A | N | ...... | 239.52.81.9 |
| 60 | Japanese | Male | 30-39 years old | Fast | B | Y | ...... | 239.52.108.9 |
| ...... | ...... | ...... | ...... | ...... | ...... | ...... | ...... | ...... |

FIG.18

| ID | Target language | Speaker attribute ||||| Speech synthesis model identifier |
|---|---|---|---|---|---|---|
| | | Gender | Age | Second speaker class | ..... | |
| ..... | ..... | ..... | ..... | ..... | ..... | ..... |
| 17 | English | Female | 20-29 years old | N | ..... | JC8 |
| 18 | English | Female | 30-39 years old | Y | ..... | JC9 |
| 19 | English | Female | 30-39 years old | N | ..... | JC10 |
| 20 | English | Female | 40-49 years old | Y | ..... | JC11 |
| ..... | ..... | ..... | ..... | ..... | ..... | ..... |
| 39 | Japanese | Male | 20-29 years old | N | ..... | EC1 |
| 40 | Japanese | Male | 30-39 years old | Y | ..... | EC2 |
| 41 | Japanese | Male | 30-39 years old | N | ..... | EC3 |
| 42 | Japanese | Male | 40-49 years old | Y | ..... | EC4 |
| ..... | ..... | ..... | ..... | ..... | ..... | ..... |

FIG.19

Speaker attribute

| Gender | ○ Male  ● Female |
| --- | --- |
| Age | ○0～9years old  ○10～19years old  ○20～29years old<br>●30～39years old ○40～49years old ○50～59years old<br>○60～69years old ○70years old |

Used language

○ English  ● Japanese  ○ Chinese
○ Hangeul  ○ French  ‥‥‥

Native

● Yes  ○ No

Used language of called party

● English  ○ Japanese  ○ Chinese
○ Hangeul  ○ French  ‥‥‥

Phone number of caller

080-1111-2256

Phone number of called party

092-1445-1122

( Dial )

FIG.20

<Source language> Japanese
<Target language> English
<Speech recognition server> 186.221.1.27
<Called party's terminal> 092-1445-1122
<Caller's terminal> 080-1111-2256
<Gender> Female
<Age> 30〜39
<Second speaker class> Y
⋮

FIG.21

```
<Source language> Japanese
<Target language> English
<Speech recognition server> 186.221.1.27
<Called party's terminal> 092-1445-1122
<Caller's terminal>  080-1111-2256
<Gender> Female
<Age>  30~39
<Second speaker class> Y
<Speaking speed> Middle
<First speaker class> A
          ⋮
```

FIG.22

```
<Source language> Japanese
<Target language> English
<Speech recognition server> 186.221.1.27
<Called party's terminal> 092-1445-1122
<Caller's terminal>  080-1111-2256
<Gender> Female
<Age>  30~39
<Second speaker class> Y
<Speaking speed> Middle
<First speaker class> A
<Translation server> 77.128.50.80
               ⋮
```

FIG.23

<Source language> Japanese
<Target language> English
<Speech recognition server> 186.221.1.27
<Called party's terminal> 092-1445-1122
<Caller's terminal> 080-1111-2256
<Gender> Female
<Age> 30～39
<Second speaker class> Y
<Speaking speed> Middle
<First speaker class> A
<Translation server> 77.128.50.80
<Speech synthesis server> 238.3.55.7
⋮

FIG.24

<Source language> Japanese
<Target language> English
<Speech recognition server> 186.221.1.27
<Translation server> 225.68.21.129
<Speech synthesis server> 88.125.6.218
<Called party's terminal> 092-1445-1122
<Caller's terminal>  080-1111-2256
<Gender> Female
<Age>  30~39
<Second speaker class> Y

FIG.30

```
<?xml version="1.0" encoding="UTF-8" ?>
< STML version="1.0" UtteranceID="8373">
<User ID="Mike"/>
< SR_IN MaxNBest="2" language="en" Task="Dictation" Domain="Travel" >
<InputAudioFormat Audio="ADPCM" Endian="Big"/>
<Voice Gender="male" Age="30" Native="no"/>
< OutputTextFormat Form="SurfaceForm"/ >
 ..................
</SR_IN>
</STML>
```

SPEECH TRANSLATION SYSTEM, FIRST TERMINAL APPARATUS, SPEECH RECOGNITION SERVER, TRANSLATION SERVER, AND SPEECH SYNTHESIS SERVER

This application is a national phase entry under 35 U.S.C. §371 of PCT Patent Application No. PCT/JP2010/053419, filed on Mar. 3, 2010, which claims priority under 35 U.S.C. §119 to Japanese Patent Application No. 2009-230442, filed Oct. 2, 2009, both of which are incorporated by reference.

TECHNICAL FIELD

The present invention relates to a speech translation system or the like that performs speech translation.

BACKGROUND ART

In conventional speech translation systems, there are techniques for improving accuracy in each portion of processing, such as for improving speech recognition accuracy and for improving translation processing accuracy (e.g., see Patent Document 1 and Patent Document 2).
[Patent Document 1] JP 2008-243080A (page 1 and FIG. 1, for example)
[Patent Document 2] JP 2009-140503A (page 1 and FIG. 1, for example)

DISCLOSURE OF INVENTION

Problem to be Solved by the Invention

However, in speech translation using the conventional speech translation systems, apparatuses or models for performing speech recognition, translation, and speech synthesis cannot be changed in accordance with speakers' attributes, and therefore, accuracy is reduced or inappropriate output occurs in each processing of speech recognition, translation, and speech synthesis.

Means for Solving the Problems

A first aspect of the present invention is directed to a speech translation system of the first invention including a first terminal apparatus for inputting speech, two or more speech recognition servers, one or more translation servers, and one or more speech synthesis servers, wherein the first terminal apparatus comprises: a first speaker attribute storage unit capable of having stored therein one or more speaker attributes which are attribute values of a speaker; a first speech accepting unit that accepts speech; a first speech recognition server selection unit that selects a speech recognition server from among the two or more speech recognition servers in accordance with the one or more speaker attributes; and a first speech sending unit that sends speech information constituted from the speech accepted by the first speech accepting unit to the speech recognition server selected by the first speech recognition server selection unit, each speech recognition server comprises: a speech recognition model storage unit capable of having stored therein a speech recognition model for all two or more languages or a part of the two or more languages; a speech information receiving unit that receives the speech information; a speech recognition unit that performs speech recognition on the speech information received by the speech information receiving unit by using the speech recognition model in the speech recognition model storage unit, and acquires a speech recognition result; and a speech recognition result sending unit that sends the speech recognition result, each translation server comprises: a translation model storage unit capable of having stored therein a translation model for all of the two or more languages or a part of the two or more languages; a speech recognition result receiving unit that receives the speech recognition result; a translation unit that translates into a target language, by using the translation model in the translation model storage unit, the speech recognition result received by the speech recognition result receiving unit, and acquires a translation result; and a translation result sending unit that sends the translation result, each speech synthesis server comprises: a speech synthesis model storage unit capable of having stored therein a speech synthesis model for all of the two or more languages or a part of the two or more languages; a translation result receiving unit that receives the translation result; a speech synthesis unit that performs, by using the speech synthesis model in the speech synthesis model storage unit, speech synthesis on the translation result received by the translation result receiving unit, and acquires a speech synthesis result; and a speech synthesis result sending unit that sends the speech synthesis result to a second terminal apparatus.

With such a configuration, in speech translation the apparatus for performing speech recognition can be changed in accordance with speaker attributes, and speech recognition processing accuracy is improved.

A second aspect of the present invention is directed to speech translation system of the second invention including a first terminal apparatus for inputting speech, one or more speech recognition servers, one or more translation servers, and one or more speech synthesis servers, wherein the first terminal apparatus comprises: a first speech accepting unit that accepts speech; and a first speech sending unit that sends speech information constituted from the speech accepted by the first speech accepting unit to the speech recognition server, each speech recognition server comprises: a third speaker attribute storage unit capable of having stored therein one or more speaker attributes which are attribute values of a speaker; a speech recognition model storage unit capable of having stored therein two or more speech recognition models for all two or more languages or a part of the two or more languages; a speech information receiving unit that receives the speech information; a speech recognition model selection unit that selects a speech recognition model from among the two or more speech recognition models in accordance with the one or more speaker attributes; a speech recognition unit that performs, by using a speech recognition model selected by the speech recognition model selection unit, speech recognition on the speech information received by the speech information receiving unit, and acquires a speech recognition result; and a speech recognition result sending unit that sends the speech recognition result, each translation server comprises: a translation model storage unit capable of having stored therein a translation model for all of the two or more languages or a part of the two or more languages; a speech recognition result receiving unit that receives the speech recognition result; a translation unit that translates into a target language, by using the translation model in the translation model storage unit, the speech recognition result received by the speech recognition result receiving unit, and acquires a translation result; and a translation result sending unit that sends the translation result, each speech synthesis server comprises: a speech synthesis model storage unit capable of having stored therein a speech synthesis model for all of the two or more languages or a part of the two or more languages; a translation result receiving unit that receives the translation result; a speech synthesis unit that performs, by using the speech synthesis model in the speech synthesis model storage unit, speech synthesis on the translation result received by the translation result receiving unit, and acquires a speech synthesis result; and a speech synthesis result sending unit that sends the speech synthesis result to a second terminal apparatus.

With such a configuration, in speech translation the model for performing speech recognition can be changed in accordance with speaker attributes, and speech recognition processing accuracy is improved.

A third aspect of the present invention is directed to a speech translation system including one or more speech recognition servers, two or more translation servers, and one or more speech synthesis servers, wherein each speech recognition server comprises: a third speaker attribute storage unit capable of having stored therein one or more speaker attributes which are attribute values of a speaker; a speech recognition model storage unit capable of having stored therein a speech recognition model for all two or more languages or a part of the two or more languages; a speech information receiving unit that receives speech information; a speech recognition unit that performs, by using the speech recognition model in the speech recognition model storage unit, speech recognition on the speech information received by the speech information receiving unit, and acquires a speech recognition result; a translation server selection unit that selects a translation server from among the two or more translation servers in accordance with the one or more speaker attributes; and a speech recognition result sending unit that sends the speech recognition result to the translation server selected by the translation server selection unit, each translation server comprises: a translation model storage unit capable of having stored therein a translation model for all of the two or more languages or a part of the two or more languages; a speech recognition result receiving unit that receives the speech recognition result; a translation unit that translates into a target language, by using the translation model in the translation model storage unit, the speech recognition result received by the speech recognition result receiving unit, and acquires a translation result; and a translation result sending unit that sends the translation result, each speech synthesis server comprises: a speech synthesis model storage unit capable of having stored therein a speech synthesis model for all of the two or more languages or a part of the two or more languages; a translation result receiving unit that receives the translation result; a speech synthesis unit that performs, by using the speech synthesis model in the speech synthesis model storage unit, speech synthesis on the translation result received by the translation result receiving unit, and acquires a speech synthesis result; and a speech synthesis result sending unit that sends the speech synthesis result to a second terminal apparatus.

With such a configuration, in speech translation the apparatus for performing translation can be changed in accordance with speaker attributes, and translation processing accuracy is improved.

A fourth aspect of the present invention is directed to a speech translation system including one or more speech recognition servers, one or more translation servers, and one or more speech synthesis servers, wherein each speech recognition server comprises: a speech recognition model storage unit capable of having stored therein a speech recognition model for all two or more languages or a part of the two or more languages; a speech information receiving unit that receives speech information; a speech recognition unit that performs, by using the speech recognition model in the speech recognition model storage unit, speech recognition on the speech information received by the speech information receiving unit, and acquires a speech recognition result; and a speech recognition result sending unit that sends the speech recognition result to the translation server, each translation server comprises: a translation model storage unit capable of having stored therein two or more translation models for all of the two or more languages or a part of the two or more languages; a fourth speaker attribute storage unit capable of having stored therein one or more speaker attributes; a speech recognition result receiving unit that receives the speech recognition result; a translation model selection unit that selects a translation model from among the two or more translation models in accordance with the one or more speaker attributes; a translation unit that translates into a target language, by using the translation model selected by the translation model selection unit, the speech recognition result received by the speech recognition result receiving unit, and acquires a translation result; and a translation result sending unit that sends the translation result, each speech synthesis server comprises: a speech synthesis model storage unit capable of having stored therein a speech synthesis model for all of the two or more languages or a part of the two or more languages; a translation result receiving unit that receives the translation result; a speech synthesis unit that performs, by using the speech synthesis model in the speech synthesis model storage unit, speech synthesis on the translation result received by the translation result receiving unit, and acquires a speech synthesis result; and a speech synthesis result sending unit that sends the speech synthesis result to a second terminal apparatus.

With such a configuration, in speech translation the model for performing translation can be changed in accordance with speaker attributes, and translation processing accuracy is improved.

A fifth aspect of the present invention is directed to a speech translation system including one or more speech recognition servers, one or more translation servers, and two or more speech synthesis servers, wherein each speech recognition server comprises: a speech recognition model storage unit capable of having stored therein a speech recognition model for all two or more languages or a part of the two or more languages; a speech information receiving unit that receives speech information; a speech recognition unit that performs, by using the speech recognition model in the speech recognition model storage unit, speech recognition on the speech information received by the speech information receiving unit, and acquires a speech recognition result; and a speech recognition result sending unit that sends the speech recognition result to the translation server, each translation server comprises: a translation model storage unit capable of having stored therein a translation model for all of the two or more languages or a part of the two or more languages; a fourth speaker attribute storage unit capable of having stored therein one or more speaker attributes; a speech recognition result receiving unit that receives the speech recognition result; a translation unit that translates into a target language, by using the translation model in the translation model storage unit, the speech recognition result received by the speech recognition result receiving unit, and acquires a translation result; a speech synthesis server selection unit that selects a speech synthesis server from among the two or more speech synthesis servers in accordance with the one or more speaker attributes; and a translation result sending unit that sends the translation result to the speech synthesis server selected by the speech synthesis server selection unit, each speech synthesis server comprises: a speech synthesis model storage unit capable of having stored therein a speech synthesis model for all of the two or more languages or a part of the two or more languages; a translation result receiving unit that receives the translation result; a speech synthesis unit that performs, by using the speech synthesis model in the speech synthesis model storage unit, speech synthesis on the translation result received by the translation result receiving unit, and acquires a speech synthesis result; and a speech synthesis result sending unit that sends the speech synthesis result to a second terminal apparatus.

With such a configuration, in speech translation the apparatus for performing speech synthesis can be changed in accordance with speaker attributes, and appropriate output is performed in speech synthesis processing.

A sixth aspect of the present invention is directed to a speech translation system including one or more speech recognition servers, one or more translation servers, and one or more speech synthesis servers, wherein each speech recognition server comprises: a speech recognition model storage unit capable of having stored therein a speech recognition model for all two or more languages or a part of the two or more languages; a speech information receiving unit that receives speech information; a speech recognition unit that performs, by using the speech recognition model in the speech recognition model storage unit, speech recognition on the speech information received by the speech information receiving unit, and acquires a speech recognition result; and a speech recognition result sending unit that sends the speech recognition result to the translation server, each translation server comprises: a translation model storage unit capable of having stored therein a translation model for all of the two or more languages or a part of the two or more languages; a speech recognition result receiving unit that receives the speech recognition result; a translation unit that translates into a target language, by using the translation model in the translation model storage unit, the speech recognition result received by the speech recognition result receiving unit, and acquires a translation result; and a translation result sending unit that sends the translation result to the speech synthesis server, each speech synthesis server comprises: a speech synthesis model storage unit capable of having stored therein two or more speech synthesis models for all of the two or more languages or a part of the two or more languages, a fifth speaker attribute storage unit capable of having stored therein one or more speaker attributes, a translation result receiving unit that receives the translation result; a speech synthesis model selection unit that selects a speech synthesis model from among the two or more speech synthesis models in accordance with the one or more speaker attributes; a speech synthesis unit that performs, by using the speech synthesis model selected by the speech synthesis model selection unit, speech synthesis on the translation result received by the translation result receiving unit, and acquires a speech synthesis result; and a speech synthesis result sending unit that sends the speech synthesis result to a second terminal apparatus.

With such a configuration, in speech translation the model for performing speech synthesis can be changed in accordance with speaker attributes, and appropriate output is performed in speech synthesis processing.

A seventh aspect of the present invention is directed to, with respect to the first aspect of the present invention, the speech translation system wherein the first terminal apparatus comprises: a first speaker attribute accepting unit that accepts one or more speaker attributes; and a first speaker attribute accumulation unit that accumulates the one or more speaker attributes in the first speaker attribute storage unit.

With such a configuration, since speaker attributes can be set in the terminal used by the speaker, the speaker attributes can be utilized in each processing of speech recognition, translation, and speech synthesis, and thus accuracy is improved and appropriate output is performed in each processing of speech recognition, translation, and speech synthesis.

An eighth aspect of the present invention is directed to, with respect to any of the second to sixth aspects of the present invention, the speech translation system wherein each speech recognition server further comprises: a speech speaker attribute acquiring unit that acquires one or more speaker attributes related to speech from the speech information received by the speech information receiving unit; and a third speaker attribute accumulation unit that accumulates, in the third speaker attribute storage unit, one or more speaker attributes acquired by the speech speaker attribute acquiring unit.

With such a configuration, since speaker attributes related to speech can be automatically obtained, the speaker attributes can be utilized in each processing of speech recognition, translation, and speech synthesis, and thus accuracy is improved and appropriate output is performed in each processing of speech recognition, translation, and speech synthesis.

A ninth aspect of the present invention is directed to, with respect to any of the second to sixth aspects of the present invention, the speech translation system wherein each translation server comprises: a language speaker attribute acquiring unit that acquires one or more speaker attributes related to language from the speech recognition result received by the speech recognition result receiving unit; and a fourth speaker attribute accumulation unit that accumulates, in the fourth speaker attribute storage unit, the one or more speaker attributes acquired by the language speaker attribute acquiring unit.

With such a configuration, since speaker attributes related to language can be automatically obtained, the speaker attributes can be utilized in each processing of speech recognition, translation, and speech synthesis, and thus accuracy is improved and appropriate output is performed in each processing of speech recognition, translation, and speech synthesis.

A tenth aspect of the present invention is directed to, with respect to any of the first to ninth aspects of the present invention, the speech translation system wherein a source language identifier for identifying a source language which is a language used by the speaker, a target language identifier for identifying a target language which is a language into which translation is performed, and speech translation control information containing one or more speaker attributes are sent from the speech recognition server via the one or more translation servers to the speech synthesis server, and the speech recognition server selection unit, the speech recognition unit, the speech recognition model selection unit, the translation server selection unit, the translation unit, or the translation model selection unit, the speech synthesis server selection unit, the speech synthesis unit, or the speech synthesis model selection unit performs respective processing by using the speech translation control information.

With such a configuration, speech translation control information that contains speaker attributes is distributed, and in speech recognition, translation, and speech synthesis, processing is performed on the assumption of the same speaker, and thus accuracy is improved and appropriate output is performed in each processing of speech recognition, translation, and speech synthesis.

Effect of the Invention

With the speech translation system of the present invention, in speech translation, accuracy is improved and appropriate output is performed in each processing of speech recognition, translation, or speech synthesis.

BEST MODE FOR CARRYING OUT THE INVENTION

Hereinafter, embodiments of a speech translation system and the like will be described with reference to the attached drawings. Note that elements assigned the same reference numerals in the embodiments perform the same operations, and thus such elements may not be repetitively described.

Embodiment 1

In the present embodiment, a network-type speech translation system capable of performing speech translation with high accuracy by, based on speaker attributes, appropriately changing a server for performing speech recognition or a speech recognition model, or appropriately changing a server for performing translation or a translation model, or appropriately changing a server for performing speech synthesis or a speech synthesis model is described.

FIG. 1 is a conceptual diagram of a speech translation system of the present embodiment. The speech translation system includes one or more first terminal apparatuses 1, one or more second terminal apparatuses 2, one or more speech recognition servers 3, one or more translation servers 4, and one or more speech synthesis servers 5.

In the speech translation system, for example, if a Japanese user (user A) of the first terminal apparatus 1 said "Ohayogozaimasu" in Japanese, the speech recognition server 3 performs speech recognition on "Ohayogozaimasu", which is Japanese. The translation server 4 translates a result of the speech recognition into, for example, English, namely, "Good morning". Next, the speech synthesis server 5 generates speech information of "Good morning" from the English text "Good morning". Then, the utterance "Good morning" is output from the second terminal apparatus 2 of a user B, who is a native English speaker.

The first terminal apparatus 1 and the second terminal apparatus 2 are, for example, terminals for talking (including telephones and mobile phones). Here, a description is given assuming that, mainly, the first terminal apparatus 1 is the speaking-side terminal, and the second terminal apparatus 2 is the spoken-side terminal, but needless to say, both terminals are interchangeable. Generally, the user A of the first terminal apparatus 1 and the user B of the second terminal apparatus carry on a conversation while the first terminal apparatus 1 and second terminal apparatus 2 sequentially and continuously interchange the speaking-side terminal and the spoken-side terminal. The first terminal apparatus 1 and the second terminal apparatus 2 are described assuming that they have similar functions (constituents described below), but needless to say, they do not have to have part of those functions respectively. In the following description, the user (speaker) of the first terminal apparatus 1 is referred to as a user A, and the user (speaker) of the second terminal apparatus 2 is referred to as a user B.

FIG. 2 is a block diagram of the speech translation system of the present embodiment. FIG. 3 is a block diagram of the speech recognition server 3. FIG. 4 is a block diagram of the translation server 4. FIG. 5 is a block diagram of the speech synthesis server 5.

The speech translation system includes one or more first terminal apparatuses 1, one or more second terminal apparatuses 2, one or more speech recognition servers 3, one or more translation servers 4, and one or more speech synthesis servers 5.

The first terminal apparatus 1 includes a first speaker attribute storage unit 11, a first speaker attribute accepting unit 12, a first speaker attribute accumulation unit 13, a first speech accepting unit 14, a first speech recognition server selection unit 15, a first speech sending unit 16, a first speech receiving unit 17, a first speech output unit 18, and a first speaker attribute sending unit 19. The first speech recognition server selection unit 15 has a first server selection information storage section 151 and a first server selection section 152.

The second terminal apparatus 2 includes a second speaker attribute storage unit 21, a second speaker attribute accepting unit 22, a second speaker attribute accumulation unit 23, a second speech accepting unit 24, a second speech recognition server selection unit 25, a second speech sending unit 26, a second speech receiving unit 27, a second speech output unit 28, and a second speaker attribute sending unit 29. The second speech recognition server selection unit 25 has a second server selection information storage section 251 and a second server selection section 252.

The speech recognition server 3 includes a third speaker attribute storage unit 301, a speech recognition model storage unit 302, a third speaker attribute receiving unit 303, a speech speaker attribute acquiring unit 304, a third speaker attribute accumulation unit 305, a speech information receiving unit 306, a speech recognition model selection unit 307, a speech recognition unit 308, a translation server selection unit 309, a speech recognition result sending unit 310, and a third speaker attribute sending unit 311. The speech recognition model selection unit 307 includes a third model selection information storage section 3071 and a third model selection section 3072. The translation server selection unit 309 includes a third server selection information storage section 3091 and a third server selection section 3092.

The translation server 4 includes a fourth speaker attribute storage unit 401, a translation model storage unit 402, a fourth speaker attribute receiving unit 403, a language speaker attribute acquiring unit 404, a fourth speaker attribute accumulation unit 405, a speech recognition result receiving unit 406, a translation model selection unit 407, a translation unit 408, a speech synthesis server selection unit 409, a translation result sending unit 410, and a fourth speaker attribute sending unit 411. The translation model selection unit 407 includes a fourth model selection information storage section 4071 and a fourth model selection section 4072. The speech synthesis server selection unit 409 includes a fourth server selection information storage section 4091 and a fourth server selection section 4092.

The speech synthesis server 5 includes a fifth speaker attribute storage unit 501, a speech synthesis model storage unit 502, a fifth speaker attribute receiving unit 503, a fifth speaker attribute accumulation unit 504, a translation result receiving unit 505, a speech synthesis model selection unit 506, a speech synthesis unit 507, and a speech synthesis result sending unit 508. The speech synthesis model selection unit 506 includes a fifth model selection information storage section 5061 and a fifth model selection section 5062.

Hereinafter, the function, implementing means and the like of each components are described. However, since the functions of the components of the first terminal apparatus 1 and the functions of the corresponding components of the second terminal apparatus 2 are the same (e.g., the functions of the first speaker attribute accepting unit 12 and of the second speaker attribute accepting unit 22 are the same), only the components of the first terminal apparatus 1 are described.

The first speaker attribute storage unit 11 constituting the first terminal apparatus 1 can have stored therein one or more speaker attributes. Speaker attributes refer to attribute values of a speaker. The speaker attributes are, for example, a speaker's gender, age, speaking speed, speaker class (a degree of skill related to the language used by the speaker in view of difficulty in used words and grammatical correctness, etc.), and the like. The speaker class refers to information indicating a degree of difficulty in used words, information indicating a degree of politeness of used terms, information indicating the degree of grammatical correctness, information indicating a multiple degree of these elements, information indicating whether or not the speaker is a native speaker, and the like. The speaker attributes may also include speaker's emotions (happy, sad, etc.), and the like. Note that, needless to say, there is no restriction to the content of the speaker attributes. Further, the speaker attributes include static speaker attribute information which are attributes that do not temporarily vary once a speaker is identified, and dynamic speaker attribute information which are attributes that may vary from time to time. The static speaker attribute information includes, for example, the above-mentioned speaker' gender, age, speaker class, and the like. The dynamic speaker attribute information includes the speaking speed, emotion, and the like.

The speaker attributes stored in the first speaker attribute storage unit 11 generally is information input by the user of the first terminal apparatus 1. Also, the speaker attributes stored in the first speaker attribute storage unit 11 generally is the static speaker attribute information. The first speaker attribute storage unit 11 may have stored therein the speech translation control information that contains one or more speaker attributes. In that case, the first speaker attribute storage unit 11 may also be referred to as a first speech translation control information storage unit 11.

The first speaker attribute accepting unit 12 accepts one or more speaker attributes from the user of the first terminal apparatus 1. Here, accepting refers to a concept that includes acceptance of information input from input devices such as a keyboard, a mouse, a touch panel, etc., receipt of information sent via a wired or wireless communication line, acceptance of information read out from recording media such as an optical disk, a magnetic disk, a semiconductor memory, and the like. The speaker attributes may be input by any means such as a numerical keypad, a keyboard, a mouse, a menu screen, and the like.

The first speaker attribute accumulation unit 13 accumulates, in the first speaker attribute storage unit 11, one or more speaker attributes accepted by the first speaker attribute accepting unit 12.

The first speech accepting unit 14 accepts speech from a user (referred to as the "user A") of the first terminal apparatus 1.

The first speech recognition server selection unit 15 selects a speech recognition server 3 from among two or more speech recognition servers in accordance with one or more speaker attributes. For example, the first speech recognition server selection unit 15 performs selection using a speech recognition server selection information management table. The first speech recognition server selection unit 15 may be in a server (a control unit 256 described later) that is not shown in the figures. In this case, the first speech sending unit 16 may also be in the server (not shown). Here, selection of the speech recognition server 3 is, for example, processing of acquiring information used to communicate with one of the speech recognition servers 3 (e.g., the IP address of one of the speech recognition servers 3). Also, it is preferable that the first speech recognition server selection unit 15 selects a speech recognition server 3 from among the two or more speech recognition servers 3 by using the speech translation control information containing one or more speaker attributes. The speech translation control information includes information with which the speech recognition server 3, the translation server 4, and the speech synthesis server 5 perform speech recognition, translation, and speech synthesis, respectively, and send processing results. The speech translation control information includes, for example, information that identifies the destination to which a processing result is sent (e.g., IP address or telephone number), information that identifies the source language and the target language (e.g., Japanese, English, or German), and the like. An accepting unit (not shown, which may alternatively be the first speaker attribute accepting unit 12) in the first terminal apparatus 1 accepts, for example, the source language and the target language from the user (which is similar in the second terminal apparatus 2). Alternatively, the first speech recognition server selection unit 15 automatically determines the source language and the target language from, for example, the telephone number or the IP address of the second terminal apparatus 2. In this case, the first speech recognition server selection unit 15 holds information that identifying languages in association with information such as telephone numbers or IP addresses, or acquires the information that identifies a language from other apparatuses by using, as the key, information such as the telephone number or the IP number. Also, the first speech recognition server selection unit 15 acquires information (e.g., IP address) that identifies the speech recognition server 3 to perform speech recognition, information (e.g., IP address) that identifies the translation server 4, and information (e.g., IP address) that identifies the speech synthesis server 5 from the source language and the target language. That is, the first speech recognition server selection unit 15 holds source languages and target languages in association with information for identifying servers, or acquires, from other apparatuses, information for identifying servers by using the source language and the target language. The speech translation control information generally contains one or more speaker attributes, and may also include information indicating a format of input speech, information indicating a format of output speech, information designating the quality of input/output speech, information indicating a format of an input text, information indicating a format of an output text, and the like.

The first server selection information storage section 151 has stored therein a speech recognition server selection information management table that contains two or more sets of speech recognition server selection information in which a speech recognition server identifiers for identifying each speech recognition server 3 is associated with one or more speaker attributes. The speech recognition server identifier is, for example, information (e.g., the IP address of one of the speech recognition servers 3) used to communicate with the speech recognition server 3.

The first server selection section 152 searches for the speech recognition server identifier corresponding to one or more speaker attributes stored in the first speaker attribute storage unit 11 from the first server selection information storage section 151.

The first speech sending unit 16 sends speech information configured from the speech accepted by the first speech accepting unit 14. The speech is sent to any of the one or more speech recognition servers 3. It is preferable that the first speech sending unit 16 sends speech information configured from the speech accepted by the first speech accepting unit 14 to the speech recognition server 3 selected by the first speech recognition server selection unit 15. Note that the first speech sending unit 16 may send the speech information to two or more speech recognition servers 3. Also, here, it is preferable that the speech information is digital information configured from speech. Further, the first speech sending unit 16 may send speech to one or more speech recognition servers 3 directly or via another apparatus (indirectly).

The first speech receiving unit 17 receives speech information that is a result of speech translation performed on the speech information configured from speech uttered by the user B of the second terminal apparatus 2. This speech information generally is information on speech translated into a language that the user A of the first terminal apparatus 1 can understand. This speech information generally is information sent from the second terminal apparatus 2 via the speech recognition server 3, the translation server 4, and the speech synthesis server 5.

The first speech output unit 18 outputs the speech information received by the first speech receiving unit 17. Here, output generally refers to speech output to a speaker.

The first speaker attribute sending unit 19 sends one or more speaker attributes stored in the first speaker attribute storage unit 11 to the speech recognition server 3 selected by the first speech recognition server selection unit 15. The first speaker attribute sending unit 19 may send the speech translation control information that contains one or more speech attributes to the speech recognition server 3 selected by the first speech recognition server selection unit 15. In this case, the first speaker attribute sending unit 19 may alternatively be referred to as a first speech translation control information sending unit 19.

The third speaker attribute storage unit 301 constituting the speech recognition server 3 can have stored therein one or more speaker attributes, which are attribute values of a speaker. The speaker attributes here may be those acquired by the speech recognition server 3, or may be those sent from the first terminal apparatus 1 or the second terminal apparatus 2, or may include both of those acquired by the speech recognition server 3 and those sent from the first terminal apparatus 1 or the second terminal apparatus 2. Also, the third speaker attribute storage unit 301 may have stored therein the speech translation control information containing one or more speaker attributes. The third speaker attribute storage unit 301 may also be referred to as a third speech translation control information storage unit 301.

The speech recognition model storage unit 302 can have stored therein a speech recognition model for all of two or more languages, or part of two or more languages. Note that the speech recognition model storage unit 302 may have stored therein two or more speech recognition models. The speech recognition model refers to, for example, an acoustic model based on a Hidden Markov Model (HMM), for example. However, the speech recognition model does not necessarily have to be an acoustic model based on HMM. The speech recognition model may be an acoustic model based on other models such as a single Gaussian distribution model, a probability model (GMM: Gaussian Mixture model), or a statistical model.

The third speaker attribute receiving unit 303 receives one or more speaker attributes directly or indirectly from the first terminal apparatus 1. The third speaker attribute receiving unit 303 may receive the speech translation control information from the first terminal apparatus 1. In this case, the third speaker attribute receiving unit 303 may be referred to as a third speech translation control information receiving unit 303.

The speech speaker attribute acquiring unit 304 acquires one or more speech speaker attributes from the speech information received by the speech information receiving unit 306. The speech speaker attributes are speaker attributes related to speech, which can be acquired from speech. It is preferable that the speech speaker attribute acquiring unit 304 acquires dynamic speaker attribute information. The speech speaker attribute acquiring unit 304 may also acquire static speaker attribute information.

Also, the speech speaker attribute acquiring unit 304 performs, for example, spectrum analysis on speech information and acquires one or more feature values. Then, the speech speaker attribute acquiring unit 304 determines speaker attributes such as the speaker's age, gender, speaking speed, and emotion from one or more feature values. The speech speaker attribute acquiring unit 304 holds, for example, information (conditions with parameters being feature values) on the feature value for determining male or/and female, and acquires gender information (e.g., male "0", female "1") by determining whether the speaker is male or female based on the one or more acquired feature values. Also, the speech speaker attribute acquiring unit 304 holds, for example, information on the feature value for determining the specific age or age group (e.g., 10's, 20's, etc.), and acquires the information on the age or age group (e.g, 9 years old or younger "0", 10's "1", etc.) by determining the speaker's age or age group from the one or more acquired feature values. Also, the speech speaker attribute acquiring unit 304 analyzes speech information and acquires the speaking speed (e.g., 4.5 utterances per second). The technique of acquiring the speaking speed will not be described in detail since it is well known. The speech speaker attribute acquiring unit 304 may also acquire, for example, emotion (kind of dynamic speaker attribute information) from the one or more acquired feature values. More specifically, the speech speaker attribute acquiring unit 304 holds, for example, values of pitch and power in the case of the emotion "normal". Then, the speech speaker attribute acquiring unit 304 obtains an average value, maximum value, and minimum value from the values of pitch and power in an extracted voiced part. The speech speaker attribute acquiring unit 304, by using the values of pitch and power of the case of the emotion "normal" and the average value, maximum value, and minimum value of power and pitch in the extracted voiced part, acquires the emotion "angry" if the average pitch is low and the average power is high. If the minimum pitch is higher and the maximum power is lower compared with the values of pitch and power of the case of the emotion "normal," the speech speaker attribute acquiring unit 304 acquires the emotion "sad". If the feature values are larger compared with the values of pitch and power of the case of the emotion "normal", the speech speaker attribute acquiring unit 304 acquires the emotion "happy".

It is preferable that the speech speaker attribute acquiring unit 304 acquires the emotion using power and rhythm among the one or more acquired feature values. As for the technique of acquiring emotions, see the theses at the URL: http://www.kansei.soft.iwate-pu.ac.jp/abstract/2007/0312004126.pdf.

Note that there is no restriction to the unit of speech information with which the speech speaker attribute acquiring unit 304 acquires the attributes such as the speaking speed. That is, the speech speaker attribute acquiring unit 304 may acquire the attributes such as the speaking speed in units of sentences, words, recognition results, or a plurality of sentences.

The speech speaker attribute acquiring unit 304 may also determine a speaker class (this speaker class is a kind of language speaker attributes) from a speech recognition result which is a result of speech recognition performed by the speech recognition unit 308. For example, the speech speaker attribute acquiring unit 304 holds a term dictionary that contains degrees of difficulty (a set of term information on two or more terms in which each term is associated with a degree of difficulty), acquires the degree of difficulty (n1, n2, . . . ) of one or more terms contained in the speech recognition result, and determines the speaker class (high degree of difficulty "0", middle degree of difficulty "1", low degree of difficulty "2", etc.) from the degree of difficulty of the one or more terms. The speech speaker attribute acquiring unit 304 also determines the speaker class using the degree of difficulty (n1, n2, . . . ) of one or more terms and whether or not any grammatical error exists. For example, if a grammatical error exists, the speech speaker attribute acquiring unit 304 acquires, as the speaker class, a value obtained by adding "1" to the final degree of difficulty (high degree of difficulty "0", middle degree of difficulty "1," and low degree of difficulty "2") acquired from one or more degrees of difficulty. Note that since the processing of detecting whether or not any grammatical error exists in a sentence is a well known natural language processing, a detailed description thereof is omitted. Note that the speech speaker attribute acquiring unit 304 may acquire speaker attributes using other methods than the above-described methods, and may acquire any kinds of speaker attributes. The technique related to the speech speaker attribute acquiring unit 304 is, for example, disclosed in "Considerations on Speaker Grouping by Sex and Age for Automatic Speech Recognition" (Seiich Nakagawa et al., IECE) (See http://www.slp.ics.tut.ac.jp/shiryou/number-1/J1980-06.pdf). Also, the speech speaker attribute acquiring unit 304 may determine the speaker attributes such as gender and age by using machine learning. That is, the speech speaker attribute acquiring unit 304 may have stored a plurality of information pairs of a gender (male or female) and one or more feature values, and determine the speaker's gender corresponding to the speech information received by the speech information receiving unit 306 with respect to the one or more feature values obtained from the speech information received by the speech information receiving unit 306 by using machine learning algorithms such as SVM and a decision tree.

The third speaker attribute accumulation unit 305 accumulates, in the third speaker attribute storage unit 301, one or more speaker attributes acquired by the speech speaker attribute acquiring unit 304. Note that the accumulation here may be temporary accumulation.

The speech information receiving unit 306 receives the speech information directly or indirectly from the first terminal apparatus 1.

The speech recognition model selection unit 307 selects a speech recognition model from among two or more speech recognition models in accordance with one or more speaker attributes.

The third model selection information storage section 3071 has stored therein a speech recognition model selection information management table. The speech recognition model selection information management table is a table containing one or more records including conditions (which may alternatively be one or more speaker attributes) related to one or more speaker attributes and speech recognition model identifiers for identifying the speech recognition models.

The third model selection section 3072 searches the speech recognition model selection information management table based on one or more speaker attributes stored in the third speaker attribute storage unit 301, and acquires a speech recognition model identifier corresponding to the one or more speaker attributes. Note that the speech recognition unit 308 reads out from the speech recognition model storage unit 302 the speech recognition model identified by the speech recognition model identifier acquired by the third model selection section 3072, and performs speech recognition processing using this speech recognition model.

The speech recognition unit 308 performs, by using the speech recognition model of the speech recognition model storage unit 302, speech recognition on the speech information received by the speech information receiving unit 306, and acquires a speech recognition result. It is preferable that the speech recognition unit 308 performs, by using the speech recognition model selected by the speech recognition model selection unit 307, speech recognition on the speech information received by the speech information receiving unit 306, and acquires the speech recognition result. The speech recognition unit 308 may use any kinds of speech recognition method. The speech recognition unit 308 is a well known technique. Information on the language (target language) to be the target of speech recognition is, for example, contained in the speech translation control information. For example, the speech translation control information is transferred among the first terminal apparatus, the speech recognition server, the translation server, the speech synthesis server, and the second terminal apparatus 2. The speech recognition result generally is a character sequence in a source language (the language of speech uttered by the user A of the first terminal apparatus 1).

The translation server selection unit 309 selects a translation server 4 from among two or more translation servers 4 in accordance with one or more speaker attributes. Note that the translation server 309 may be in a server (not shown). In that case, the speech recognition result sending unit 310 may also be in the server (not shown). Also, in that case, information on the translation server 4 to be selected may be sent from the server (not shown).

The third server selection information storage section 3091 has stored therein a translation server selection information management table. The translation server selection management table is a table containing one or more records including conditions (which may alternatively be one or more speaker attributes) related to one or more speaker attributes and translation server identifiers for identifying the translation servers 4.

The third server selection section 3092 searches the translation server selection information management table based on one or more speaker attributes stored in the third speaker attribute storage unit 301, and acquires the translation server identifier corresponding to the one or more speaker attributes. Note that the speech recognition result sending unit 310 sends the speech recognition result to the translation server 4 corresponding to the translation server identifier acquired by the third server selection section 3092.

The speech recognition result sending unit 310 directly or indirectly sends the speech recognition result to the translation server 4. It is preferable that the speech recognition result sending unit 310 directly or indirectly sends the speech recognition result to the translation server 4 selected by the translation server selection unit 309.

The third speaker attribute sending unit 311 sends one or more speaker attributes stored in the third speaker attribute storage unit 301 directly or indirectly to the translation server 4. The third speaker attribute sending unit 311 may send the speech translation control information to the translation server 4. In this case, the third speaker attribute sending unit 311 may be referred to as a third speech translation control information sending unit 311.

The fourth speaker attribute storage unit 401 constituting the translation server 4 can have stored therein one or more speaker attributes. The fourth speaker attribute storage unit 401 may have stored therein the speech translation control information. In this case, the fourth speaker attribute storage unit 401 may be referred to as a fourth speech translation control information storage unit 401.

The translation model storage unit 402 can have stored therein information for translation with respect to all of the two or more languages, or a part of the two or more languages. The translation model storage unit 402 may have stored therein two or more sets of information for translation. The information for translation refers to, for example, a translation model and a language model. Also, the translation model storage unit 402 may have stored therein one or more translation models only, without having any language model. In this case, the translation model storage unit 402 may have stored therein one or more translation models. Note that the selection of the translation model described later is assumed to have the same meaning as the selection of the information for translation.

The fourth speaker attribute receiving unit 403 receives one or more speaker attributes directly or indirectly from the speech recognition server 3. The fourth speaker attribute receiving unit 403 may receive the speech translation control information from the speech recognition server 3. In this case, the fourth speaker attribute receiving unit 403 may be referred to as a fourth speech translation control information receiving unit 403.

The language speaker attribute acquiring unit 404 acquires one or more language speaker attributes from the speech recognition result received by the speech recognition result receiving unit 406. The language speaker attributes are speaker attributes that can be obtained with language processing. The language speaker attribute acquiring unit 404 performs, for example, natural language processing on the speech recognition result, and specifies a speaker class. The speaker class is, for example, information in which a speaker is categorized by a degree of language skill in view of difficulty in used words, the grammatical correctness, and the like. The language speaker attribute acquiring unit 404 determines the speaker class based on, for example, the frequency and proportion of use of difficult terms in the speech recognition result. Also, the language speaker attribute acquiring unit 404 determines the speaker class based on, for example, whether or not polite words are used, and the frequency and proportion of use of polite words in the speech recognition result. Also, the language speaker attribute acquiring unit 404 determines the speaker class based on, for example, whether or not new words that are often used by female high-school students are used, and the frequency and proportion of use of new words in the speech recognition result. The language speaker attribute acquiring unit 404 has stored therein, for example, morphemes that constitute difficult terms or polite words, new words often used by female high-school students, and the like, performs morphological analysis on the speech recognition result, acquires the frequency or proportion of the morphemes that constitute difficult terms or polite words or of new words often used by female high-school students included, and determines the speaker class (rank) based on predetermined conditions (Rank A: difficult terms being 10% or more, B: difficult terms being 1% or more and less than 10%, C: difficult terms being less than 1%, for example). The language speaker attribute acquiring unit 404 may acquire one or more language speaker attributes by performing natural language processing on the speech recognition result with other kinds of algorithm. Note that the language speaker attribute acquiring unit 404 may acquire one or more language speaker attributes with the same method as the method of acquiring the language speaker attributes in the speech speaker attribute acquiring unit 304.

The fourth speaker attribute accumulation unit 405 at least temporarily accumulates, in the fourth speaker attribute storage unit 401, one or more speaker attributes acquired by the fourth speaker attribute receiving unit 403. The fourth speaker attribute accumulation unit 405 may accumulate the speech translation control information in the fourth speaker attribute storage unit 401. In this case, the fourth speaker attribute accumulation unit 405 may be referred to as a fourth speech translation control information accumulation unit 405.

The speech recognition result receiving unit 406 receives the speech recognition result directly or indirectly from the speech recognition server 3.

The translation model selection unit 407 selects a translation model from among two or more translation models in accordance with one or more speaker attributes received by the fourth speaker attribute receiving unit 403.

The fourth model selection information storage section 4071 has stored therein a translation model selection information management table. The translation model selection information management table is a table containing one or more records including conditions (which may alternatively be one or more speaker attributes) related to one or more speaker attributes and translation model identifiers for identifying the translation models.

The fourth model selection section 4072 searches the translation model selection information management table based on one or more speaker attributes stored in the fourth speaker attribute storage unit 401, and acquires the translation model identifier corresponding to the one or more speaker attributes. Note that the translation unit 408 acquires from the translation model storage unit 402 the translation model corresponding to the translation model identifier acquired by the fourth model selection section 4072, and performs translation processing by using this translation model.

The translation unit 408 translates the speech recognition result received by the speech recognition result receiving unit 406 into the target language by using the translation model in the translation model storage unit 402, and acquires a translation result. It is preferable that the translation unit 408 translates the speech recognition result received by the speech recognition result receiving unit 406 into the target language by using the translation model selected by the translation model selection unit 407, and acquires a translation result. Note that the information for identifying the source language and the target language is, for example, contained in the speech translation control information. Further, there is no restriction to the translation method used in the translation unit 408. The translation unit 408 is a well known technique.

The speech synthesis server selection unit 409 selects a speech synthesis server 5 from among two or more speech synthesis servers 5 in accordance with one or more speaker attributes.

The fourth server selection information storage section 4091 has stored therein a speech synthesis server selection information management table. The speech synthesis server selection information management table is a table containing one or more records including conditions (which may alternatively be one or more speaker attributes) related to one or more speaker attributes and speech synthesis server identifiers for identifying the speech synthesis servers 5.

The fourth server selection section 4092 searches the speech synthesis server selection information management table based on one or more speaker attributes stored in the fourth speaker attribute storage unit 401, and acquires the speech synthesis server identifier corresponding to the one or more speaker attributes. Note that the translation result sending unit 410 sends the translation result to the speech synthesis server 5 corresponding to the speech synthesis server identifier acquired by the fourth server selection section 4092.

The translation result sending unit 410 sends a translation result which is the result of translation processing performed by the translation unit 408 directly or indirectly to the speech synthesis server 5. It is preferable that the translation result sending unit 410 sends the translation result directly or indirectly to the speech synthesis server 5 selected by the speech synthesis server selection unit 409.

The fourth speaker attribute sending unit 411 sends one or more speaker attributes received by the fourth speaker attribute receiving unit 403 to the speech synthesis server 5 directly or indirectly. The fourth speaker attribute sending unit 411 may also send the speech translation control information to the speech synthesis server 5. In this case, the fourth speaker attribute sending unit 411 may be referred to as a fourth speech translation control information sending unit 411.

The fifth speaker attribute storage unit 501 constituting the speech synthesis server 5 can have stored therein one or more speaker attributes. The fifth speaker attribute storage unit 501 may have stored therein the speech translation control information. In this case, the fifth speaker attribute storage unit 501 may be referred to as a fifth speech translation control information storage unit 501.

The speech synthesis model storage unit 502 can have stored therein a speech synthesis model for all of the two or more languages, or a part of the two or more languages. The speech synthesis model storage unit 502 may have stored therein two or more speech synthesis models.

The fifth speaker attribute receiving unit 503 receives one or more speaker attributes from the speech recognition server 3 directly or indirectly. The fifth speaker attribute receiving unit 503 may receive the speech translation control information from the speech recognition server 3. In this case, the fifth speaker attribute receiving unit 503 may be referred to as a fifth speech translation control information receiving unit 503.

The fifth speaker attribute accumulation unit 504 at least temporarily accumulates, in the fifth speaker attribute storage unit 501, one or more speaker attributes received by the fifth speaker attribute receiving unit 503. The fifth speaker attribute accumulation unit 504 may accumulate the speech translation control information in the fifth speaker attribute storage unit 501. In this case, the fifth speaker attribute accumulation unit 504 may be referred to as a fifth speech translation control information accumulation unit 504.

The translation result receiving unit 505 receives the translation result from the translation server 4 directly or indirectly.

The speech synthesis model selection unit 506 selects a speech synthesis model from among two or more speech synthesis models in accordance with one or more speaker attributes received by the fifth speaker attribute receiving unit 503.

The fifth model selection information storage section 5061 has stored therein a speech synthesis model selection information management table. The speech synthesis model selection information management table is a table containing one or more records including conditions (which may alternatively be one or more speaker attributes) related to one or more speaker attributes and speech synthesis model identifiers for identifying the speech synthesis models.

The fifth model selection section 5062 searches the speech synthesis model selection information management table based on one or more speaker attributes stored in the fifth speaker attribute storage unit 501, and acquires the speech synthesis model identifier corresponding to the one or more speaker attributes. Note that the speech synthesis unit 507 acquires from the speech synthesis model storage unit 502 the speech synthesis model corresponding to the speech synthesis model identifier acquired by the fifth model selection section 5062, and performs speech synthesis processing using this speech synthesis model.

The speech synthesis unit 507 performs speech synthesis on the translation result received by the translation result receiving unit 505 by using the speech synthesis model in the speech synthesis model storage unit 502, and acquires a speech synthesis result. It is preferable that the speech synthesis unit 507 performs speech synthesis on the translation result received by the translation result receiving unit 505 by using the speech synthesis model selected by the speech synthesis model selection unit 506, and acquires a speech synthesis result. Here, the information for identifying the target language of speech synthesis is, for example, contained in the speech translation control information.

The speech synthesis result sending unit 508 sends the speech synthesis result acquired by the speech synthesis unit 507 to the second terminal apparatus 2 directly or indirectly.

The first speaker attribute storage unit 11, the first server selection information storage section 151, the second speaker attribute storage unit 21, the second server selection information storage section 251, the third speaker attribute storage unit 301, the speech recognition model storage unit 302, the third model selection information storage section 3071, the third server selection information storage section 3091, the fourth speaker attribute storage unit 401, the translation model storage unit 402, the fourth model selection information storage section 4071, the fourth server selection information storage section 4091, the fifth speaker attribute storage unit 501, the speech synthesis model storage unit 502, and the fifth model selection information storage section 5061 are preferably nonvolatile recording media, but can also be realized by volatile media. There is no restriction to the process by which the above information is stored in the first speaker attribute storage unit 11 and so on. For example, the above information may be stored in the first speaker attribute storage unit 11 and so on via recording media, or the above information sent via a communication line or the like may be stored on the first speaker attribute storage unit 11 and so on. Alternatively, the above information input via an input device may be stored in the first speaker attribute storage unit 11 and so on.

The first speaker attribute accepting unit 12 and the second speaker attribute accepting unit 22 can be realized by a device driver of input means such as a numerical keypad or a keyboard, menu screen control software, or the like.

The first speech accepting unit 14 and the second speech accepting unit 24 can be realized by, for example, a microphone and a device driver thereof, and the like.

The first speech sending unit 16, the first speech receiving unit 17, the first speaker attribute sending unit 19, the second speech sending unit 26, the second speech receiving unit 27, the second speaker attribute sending unit 29, the third speaker attribute receiving unit 303, the speech information receiving unit 306, the speech recognition result sending unit 310, the third speaker attribute sending unit 311, the fourth speaker attribute receiving unit 403, the speech recognition result receiving unit 406, the translation result sending unit 410, the fourth speaker attribute sending unit 411, the fifth speaker attribute receiving unit 503, the translation result receiving unit 505, and the speech synthesis result sending unit 508 are generally realized by wireless or wired communication means, but may also be realized by broadcasting means or broadcast receiving means.

The first speech output unit 18 and the second speech output unit 28 can be realized by, for example, a speaker and a device driver thereof, and the like.

The first speaker attribute accumulation unit 13, the first speech recognition server selection unit 15, the first server selection information storage section 151, the second speaker attribute accumulation unit 23, the second speech recognition server selection unit 25, the second server selection section 252, the speech speaker attribute acquiring unit 304, the third speaker attribute accumulation unit 305, the speech recognition model selection unit 307, the speech recognition unit 308, the translation server selection unit 309, the third model selection section 3072, the third server selection section 3092, the language speaker attribute acquiring unit 404, the fourth speaker attribute accumulation unit 405, the translation model selection unit 407, the translation unit 408, the speech synthesis server selection unit 409, the fourth model selection section 4072, the fourth server selection section 4092, the fifth speaker attribute accumulation unit 504, the speech synthesis model selection unit 506, the speech synthesis unit 507, and the fifth model selection section 5062 can be generally realized by MPUs, memories, or the like. The processing procedures of the first speaker attribute accumulation section 13 and so on are generally realized by software, and the software therefor is recorded in recording media such as a ROM. However, it may also be realized by hardware (dedicated circuit).

Next, an operation of the speech translation system is described using the flowcharts in FIG. 6 to FIG. 10. First, the operation of the first terminal apparatus 1 is described using the flowchart in FIG. 6.

(Step S601) An accepting unit of the first speaker attribute accepting unit 12 or the like determines whether or not an input from the user A has been accepted. If an input has been accepted, the procedure proceeds to step S602, and if not, the procedure proceeds to step S606.

(Step S602) The first speaker attribute accepting unit 12 determines whether or not the input accepted at step S601 is a speaker attribute. If the input is a speaker attribute, the procedure proceeds to step S603, and if not, the procedure proceeds to step S604.

(Step S603) The first speaker attribute accumulation unit 13 accumulates one or more accepted speaker attributes in the first speaker attribute storage unit 11. The procedure returns to step S601.

(Step S604) An accepting unit (not shown) determines whether or not the input accepted at step S601 is a call request. If the input is a call request, the procedure proceeds to step S605, and if not, the procedure returns to step S601. Note that a call request is a request for phone conversation to the user B of the second terminal apparatus 2, and generally contains a second terminal apparatus identifier (telephone number, for example) of the second terminal apparatus 2.

(Step S605) A call unit (not shown) calls the second terminal apparatus 2. Then, as a result of calling, conversation is started. The procedure returns to step S601.

(Step S606) The first speech accepting unit 14 determines whether or not speech of the user A has been accepted. If the speech has been accepted, the procedure proceeds to step S607, and if not, the procedure returns to step S601.

(Step S607) The first server selection section 152 reads out one or more speaker attributes from the first speaker attribute storage unit 11.

(Step S608) The first server selection section 152 applies the one or more speaker attributes read out at step S607 to first server selection information (the speech recognition server selection information management table) in the first server selection information storage section 151, and selects the speech recognition server 3. Here, selection of the speech recognition server 3 is, for example, to acquire one of the speech recognition server identifiers.

(Step S609) The first speaker attribute sending unit 19 configures speech translation control information by using one or more speaker attributes stored in the first speaker attribute storage unit 11. The first speaker attribute sending unit 19 acquires, for example, the identifier of the target language determined from the input telephone number of the second terminal apparatus 2. Also, the first speaker attribute sending unit 19 acquires the identifier of the source language determined from the stored telephone number of the first terminal apparatus 1. For example, since a telephone number contains a country code, the first speaker attribute sending unit 19 determines the target language from that country code. The first speaker attribute sending unit 19 holds a correspondence table of country codes and target language identifiers (e.g., a table having records such as "81: Japanese", "82: Korean", etc.). Then, the first speaker attribute sending unit 19 configures the speech translation control information based on one or more speaker attributes stored in the first speaker attribute storage unit 11, the source language identifier, the target language identifier, and the like.

(Step S610) The first speech sending unit 16 digitalizes the speech accepted at step S606 and acquires speech information. Then, the first speech sending unit 16 sends this speech information to the speech recognition server 3 selected at step S608.

(Step S611) The first speaker attribute sending unit 19 sends the speech translation control information configured at step S609 to the speech recognition server 3 selected at step S608. Note that the first speaker attribute sending unit 19 may send only one or more speaker attributes to the speech recognition server 3 selected at step S608. The procedure returns to step S601.

Note that it is preferable that in the flowchart in FIG. 6, the processes of step S607, step S608, step S609, and step S611 are not performed again during conversation. That is, it is preferable that during a single phone conversation, the processes of step S607, step S608, step S609, and step S611 are performed once or the smaller number of times than the number of sending of the speech information.

Further, in the flowchart shown in FIG. 6, the processing ends due to powering off or interruption for aborting the processing.

Also, since the operation of the second terminal apparatus 2 is the same as the operation of the first terminal apparatus 1, the description is omitted.

Next, an operation of the speech recognition server 3 will be described using the flowchart in FIG. 7.

(Step S701) The speech information receiving unit 306 determines whether or not speech information has been received. If the speech information has been received, the procedure proceeds to step S702, and if not, the procedure returns to step S701.

(Step S702) The third speaker attribute receiving unit 303 determines whether or not speech translation control information has been received. If the speech translation control information has been received, the procedure proceeds to step S703, and if not, the procedure proceeds to step S710.

(Step S703) The speech speaker attribute acquiring unit 304 acquires one or more speaker attributes from the speech information received at step S701. This process is referred to as a speaker attribute acquiring process, which will be described using the flowchart in FIG. 8.

(Step S704) The third speaker attribute accumulation unit 305 adds the one or more speaker attributes acquired at step S703 to the speech translation control information received at step S702, thus configures new speech translation control information, and at least temporarily accumulates this speech translation control information in the third speaker attribute storage unit 301. Note that the third speaker attribute storage unit 305 does not have to add all speaker attributes acquired at step S703 to the speech translation control information received at step S702. Also, the third speaker attribute accumulation unit 305 may give priority to all speaker attributes acquired at step S703 and corrects a part of the speaker attributes in the speech translation control information received at step S702. If all speaker attributes acquired at step S703 are given priority, there are advantages of, for example, easier speech recognition of speech of male voice which sounds like female.

(Step S705) The third model selection section 3072 searches the speech recognition model selection information management table based on one or more speaker attributes contained in the speech translation control information stored in the third speaker attribute storage unit 301, and acquires a speech recognition model identifier. That is, the third model selection section 3072 selects a speech recognition model. Then, the third model selection section 3072 reads out the selected speech recognition model from the speech recognition model storage unit 302.

(Step S706) The speech recognition unit 308 performs speech recognition processing on the speech information received at step S701 by using the read speech recognition model. Then, the speech recognition unit 308 acquires a speech recognition result.

(Step S707) The third server selection section 3092 searches the translation server selection information management table based on one or more speaker attributes contained in the speech translation control information stored in the third speaker attribute storage unit 301, and acquires the translation server identifier corresponding to the one or more speaker attributes.

(Step S708) The speech recognition result sending unit 310 sends the speech recognition result acquired at step S706 to the translation server 4 corresponding to the translation server identifier acquired at step S707.

(Step S709) The third speaker attribute sending unit 311 sends the speech translation control information stored in the third speaker attribute storage unit 301 to the translation server 4 corresponding to the translation server identifier acquired at step S707, and the procedure returns to step S701.

(Step S710) The third model selection section 3072 determines whether or not the speech translation control information has been stored in the third speaker attribute storage unit 301. If the speech translation control information has been stored, the procedure proceeds to step S711, and if not, the procedure proceeds to step S712.

(Step S711) The third model selection section 3072 reads out the speech translation control information stored in the third speaker attribute storage unit 301, and the procedure proceeds to step S705.

(Step S712) The third model selection section 3072 reads out an arbitrary speech recognition model stored in the speech recognition model storage unit 302, and the procedure proceeds to step S706.

Note that in the flowchart in FIG. 7, if the speech recognition has been performed in the speaker attribute acquiring process, the speech recognition processing does not have to be performed again. However, it is preferable that even when speech recognition has been performed in the speaker attribute acquiring process, a speech recognition model is selected and speech recognition processing is performed with high accuracy.

Further, in the flowchart in FIG. 7, the speaker attribute acquiring process at step S703 may also be performed on the result of the speech recognition process.

Further, in the flowchart shown in FIG. 7, the processing ends due to powering off or interruption for aborting the processing.

The speaker attribute acquiring process at step S703 is described using the flowchart in FIG. 8.

(Step S801) The speech speaker attribute acquiring unit 304 acquires one or more feature values from the speech information (or performs speech analysis). Feature vector data which is a vector constituted from one or more feature values acquired by the speech speaker attribute acquiring unit 304 is, for example, an MFCC obtained by discrete cosine transforming a filter bank output of a channel number of 24 using a triangle filter, and includes 12 dimensions of its static parameter, delta parameter, and delta-delta parameter, respectively, as well as normalized power, delta power, and delta-delta power (39 dimensions).

(Step S802) The speech speaker attribute acquiring unit 304 determines the speaker's gender by using the one or more feature values acquired at step S801.

(Step S803) The speech speaker attribute acquiring unit 304 determines the speaker's age group by using the one or more feature values acquired at step S801.

(Step S804) The speech speaker attribute acquiring unit 304 acquires the speaking speed from the speech information. Note that the technique of acquiring the speaking speed is well known.

(Step S805) The speech speaker attribute acquiring unit 304 requests speech recognition processing from the speech recognition unit 308, and obtains a speech recognition result.

(Step S806) The speech speaker attribute acquiring unit 304 performs natural language processing on the speech recognition result acquired at step S805, and determines the speaker class. The procedure returns to the precedent process.

Note that in the flowchart in FIG. 8, the process (e.g., step S802) of acquiring speaker attributes (e.g., gender) contained in the received speech translation control information (speaker attributes) does not have to be performed. It results in speedup of the processing. Also, it is preferable that the speaker attributes (such as gender and age group) that do not vary depending on conversation are acquired only once, and the speaker attributes (such as speaking speed) that varies during conversation are acquired as necessary or changed by using accumulated information.

Next, an operation of the translation server 4 will be described using the flowchart in FIG. 9.

(Step S901) The speech recognition result receiving unit 406 determines whether or not a speech recognition result has been received. If the speech recognition result has been received, the procedure proceeds to step S902, and if not, the procedure returns to step S901.

(Step S902) The fourth speaker attribute receiving unit 403 determines whether or not speech translation control information has been received. If the speech translation control information has been received, the procedure proceeds to step S903, and if not, the procedure proceeds to step S909.

(Step S903) The language speaker attribute acquiring unit 404 performs natural language processing on the speech recognition result acquired at step S901, and acquires one or more language speaker attributes. The language speaker attribute acquiring unit 404 acquires the speaker class from, for example, the speech recognition result.

(Step S904) The fourth speaker attribute accumulation unit 405 adds the one or more language speaker attributes acquired at step S903 to the speech translation control information received at step S902, thus configures the speech translation control information, and at least temporarily accumulates, in the fourth speaker attribute storage unit 401, this speech translation control information.

(Step S905) The fourth model selection section 4072 searches the translation model selection information management table by using one or more speaker attributes contained in the speech translation control information received at step S902, or one or more speaker attributes contained in the speech translation control information stored in the fourth speaker attribute storage unit 401, and acquires a translation model identifier. That is, the fourth model selection section 4072 selects a translation model. Then, the fourth model selection unit 4072 reads out the selected translation model from the translation model storage unit 402.

(Step S906) The translation unit 408 performs translation processing on the speech recognition result received at step S901 by using the read translation model. Then, the translation unit 408 obtains a translation result.

(Step S907) The fourth server selection section 4092 searches the speech synthesis server selection information management table by using one or more speaker attributes contained in the speech translation control information stored in the fourth speaker attribute storage unit 401, and acquires the speech synthesis server identifier corresponding to the one or more speaker attributes.

(Step S908) The translation result sending unit 410 sends the translation result acquired at step S906 to the speech synthesis server 5 corresponding to the speech synthesis server identifier acquired at step S907.

(Step S909) The fourth speaker attribute sending unit 411 sends the speech translation control information stored in the fourth speaker attribute storage unit 401 to the speech synthesis server 5 corresponding to the speech synthesis server identifier acquired at step S907. Then, the procedure returns to step S901.

(Step S910) The fourth model selection section 4072 determines whether or not the speech translation control information has been stored in the fourth speaker attribute storage unit 401. If the speech translation control information has been stored, the procedure proceeds to step S911, and if not, the procedure proceeds to step S912.

(Step S911) The fourth model selection section 4072 reads out the speech translation control information stored in the fourth speaker attribute storage unit 401. Then, the procedure proceeds to step S905.

(Step S912) The fourth model selection section 4072 reads out an arbitrary translation model stored in the translation model storage unit 402. Then, the procedure proceeds to step S906.

Note that in the flowchart in FIG. 9, the processing ends due to powering off or interruption for aborting the processing.

Next, an operation of the speech synthesis server 5 is described using the flowchart in FIG. 10.

(Step S1001) The translation result receiving unit 505 determines whether or not a translation result has been received. If the translation result has been received, the procedure proceeds to step S1002, and if not, the procedure returns to step S1001.

(Step S1002) The fifth speaker attribute receiving unit 503 determines whether or not speech translation control information has been received. If the speech translation control information has been received, the procedure proceeds to step S1003, and if not, the procedure proceeds to step S1007.

(Step S1003) The fifth speaker attribute accumulation unit 504 at least temporarily accumulates, in the fifth speaker attribute storage unit 501, the speech translation control information received at step S1002.

(Step S1004) The fifth model selection section 5062 searches the speech synthesis model selection information management table by using one or more speaker attributes contained in the speech translation control information stored in the fifth speaker attribute storage unit 501, and acquires a speech synthesis model identifier. That is, the fifth model selection section 5062 selects a speech synthesis model. Then, the fifth model selection section 5062 reads out the selected speech synthesis model from the speech synthesis model storage unit 502.

(Step S1005) The speech synthesis unit 507 performs speech synthesis processing on the translation result received at step S1001 by using the read speech synthesis model. Then, the speech synthesis unit 507 acquires speech-synthesized speech information (speech synthesis result).

(Step S1006) The speech synthesis result sending unit 508 sends the speech synthesis result acquired at step S1005 to the second terminal apparatus 2. Note that, for example, the second terminal apparatus identifiers for identifying the second terminal apparatus 2 (e.g., telephone number or IP address of the second terminal apparatus 2) are contained in the speech translation control information. Then, the procedure returns to step S1001.

(Step S1007) The fifth model selection section 5062 determines whether or not the speech translation control information has been stored in the fifth speaker attribute storage unit 501. If the speech translation control information has been stored, the procedure proceeds to step S1008, and if not, the procedure proceeds to step S1009.

(Step S1010) The fifth model selection section 5062 reads out the speech translation control information stored in the fifth speaker attribute storage unit 501. Then, the procedure proceeds to step S1004.

(Step S1011) The fifth model selection section 5062 reads out an arbitrary speech synthesis model stored in the speech synthesis model storage unit 502. Then, the procedure proceeds to step S1005.

Note that in the flowchart in FIG. 10, the processing ends due to powering off or interruption for aborting the processing.

Hereinafter, a specific operation of the speech translation system of the present embodiment will be described. The conceptual diagram of the speech translation system is as shown in FIG. 1.

Now, the user A of the first terminal apparatus 1 is a 37-year-old female who speaks Japanese, and is a native Japanese speaker. The user B of the second terminal apparatus 2 is a 38-year-old male who speaks English, and is a native English speaker.

A first speaker attribute management table shown in FIG. 11 is stored in the first speaker attribute storage unit 11 in the first terminal apparatus 1. The first speaker attribute management table has stored the gender: "female", the age: "37 years old", the language in use: "Japanese", and NATIVE: "yes".

A second speaker attribute management table shown in FIG. 12 has been stored in the second speaker attribute storage unit 21 in the second terminal apparatus 2.

A speech recognition server selection information management table shown in FIG. 13 has been stored in the first server selection information storage section 151 in the first terminal apparatus 1 and the second server selection information storage section 251 in the second terminal apparatus 2. The speech recognition server selection information management table has stores therein one or more records of attribute values of "ID", "language", "speaker attribute", and "speech recognition server identifier". The "language" is the target language of speech recognition. The "speaker attribute" includes "gender", "age (here, age category)", and the like. The "speech recognition server identifier", which is information for communication with the speech recognition server 3, is an IP address here. Note that the first server selection information storage section 151 only needs to contain at least the record corresponding to the language: "Japanese" in the speech recognition server selection information table. Also, the second server selection information storage section 251 only needs to contain at least the record corresponding to the language: "English" in the speech recognition server selection information table.

A speech recognition model selection information management table shown in FIG. 14 has been stored in the third model selection information storage section 3071 in the speech recognition server 3. The speech recognition model selection information management table has stores therein one or more records of attribute values of "language", "speaker attribute", and "speech recognition model identifier". The "speech recognition model identifier", which is information for identifying the speech recognition models, is used to read out the speech recognition models, for example. Here, for example, the "speech recognition model identifier" is a file name in which a speech recognition model has been stored, or the like.

A translation server selection information management table shown in FIG. 15 has been stored in the third server selection information storage section 3091 in the speech recognition server 3. The translation server selection information management table has stored one or more records of attribute values of "ID", "source language", "target language", "speaker attribute", and "translation server identifier". The "source language" is an original language for translation. The "target language" is a destination language for translation. The "speaker attribute" here includes "gender", "age", "first speaker class", and the like. The "first speaker class" is information on a presumed level of intelligence of the speaker determined from difficulty in used words. It is assumed that if the "first speaker class" is "A", the speaker's level of intelligence is high. Also, it is assumed that if the "first speaker class" is "B" or "C", the speaker's level of intelligence is middle or low. An exemplary method for estimating the level of intelligence will be described later. The "translation server identifier", which is information for communication with the translation server 4, is an IP address here.

Also, a translation model selection information management table shown in FIG. 16 has been stored in the fourth model selection information storage section 4071 in the translation server 4. The translation model selection information management table has stored therein one or more records of attribute values of "ID", "source language", "speaker attribute", and "translation model identifier". The "speaker attribute" here includes "gender", "age", "second speaker class", and the like. The "second speaker class" indicates whether or not a speaker is a native speaker of the language in use. If the speaker is a native speaker, the attribute value is "Y," and if not, the attribute value is "N". The "translation model identifier", which is information for identifying the translation models, is used to read out the translation models, for example. Here, for example, the "translation model identifier" is a file name in which a translation model is stored, or the like.

Also, a speech synthesis server selection information management table shown in FIG. 17 is stored in the fourth server selection information storage section 4091 in the translation server 4. The speech synthesis server selection information management table has stored therein one or more records of attribute values of "ID", "target language", "speaker attribute", and "speech synthesis server identifier". The "speaker attribute" here includes "gender", "age", "speaking speed", "first speaker class", "second speaker class", and the like. The "speaking speed", which is the speed of speaking, can take any of values "fast," "middle," and "slow". "Fast" indicates, for example, the speaking speed of "5 syllables per second" or higher, "middle" indicates, for example, the speaking speed of "3 syllables per second" or higher and lower than "5 syllables per second", and "slow" indicates, for example, the speaking speed of lower than "3 syllables per second". However, there is no restriction to types of categorization, methods of categorization, algorithms, and the like for the "speaking speed". The "speech synthesis server identifier", which is information for communication with the speech synthesis server 5, is an IP address here.

A speech synthesis model selection information management table shown in FIG. 18 has been stored in the fifth model selection information storage section 5061 in the speech synthesis server 5. The speech synthesis model selection information management table has stored therein one or more records of attribute values of "ID", "target language", "speaker attribute", and "speech synthesis model identifier". The "speaker attribute" here includes "gender", "age", "second speaker class", and the like. It is further preferable that "speaking speed" and "first speaker class" are included in the "speaker attribute." The "speech synthesis model identifier", which is information for identifying the speech synthesis models, is used to read out the speech synthesis models, for example. Here, for example, the "speech synthesis model identifier" is a file name in which a speech synthesis model has been stored, or the like.

In such a situation, the user A is trying to call the user B. The user A invoked the screen of FIG. 19, which is a screen for inputting a telephone number or the like of a called party (user B), from the first terminal apparatus. Then, the first terminal apparatus 1 reads out the first speaker attribute management table (FIG. 11) stored in the first speaker attribute storage unit 11, and displays the screen of FIG. 19. It is assumed that the user then input the language used by the called party and the called party's telephone number, and pressed the "dial" button. Note that it is assumed that in FIG. 19, the caller's telephone number "080-1111-2256" has been stored in a recording medium (not shown).

Next, a calling unit (not shown) in the first terminal apparatus 1 calls the second terminal apparatus 2. Then, conversation is started.

Next, the first speech accepting unit 14 in the first terminal apparatus 1 accepts the speech "Ohayogozaimasu" of the user A.

Next, the first server selection section 152 reads out the speaker attributes of FIG. 11 from the first speaker attribute storage unit 11.

Next, the first server selection section 152 applies the read one or more speaker attributes "gender: female, age: 37, used language: Japanese . . . " to the speech recognition server selection information management table of FIG. 13, searches for the record of "ID=7", and acquires the speech recognition server identifier "186.221.1.27".

Next, the first speaker attribute sending unit 19 configures the speech translation control information by using one or more speaker attributes. The speaker attribute sending unit 19 configures, for example, the speech translation control information shown in FIG. 20. This speech translation control information contains one or more speaker attributes and the information (language used by the called party (target language)) input by the user A from the screen of FIG. 19. Further, the speech translation control information contains the speech recognition server identifier "186.221.1.27".

Next, the first speech sending unit 16 digitalizes the accepted speech "Ohayogozaimasu", and acquires speech information of "Ohayogozaimasu". Then, the first speech sending unit 16 sends this speech information to the speech recognition server 3 identified as "186.221.1.27".

Next, the first speaker attribute sending unit 19 sends the speech translation control information of FIG. 20 to the speech recognition server 3 identified as "186.221.1.27".

Next, the speech information receiving unit 306 in the speech recognition server 3 receives the speech information "Ohayogozaimasu". Then, the third speaker attribute receiving unit 303 receives the speech translation control information of FIG. 20.

Next, the speech speaker attribute acquiring unit 304 acquires one or more speaker attributes from the received speech information "Ohayogozaimasu". That is, the third speaker attribute receiving unit 303 acquires one or more feature values from the speech information "Ohayogozaimasu". Then, the third speaker attribute receiving unit 303 acquires prescribed information by using the one or more feature values. Here, while the speech translation control information of FIG. 20 contains speaker attributes such as gender and age, the third speaker attribute receiving unit 303 may acquire the speaker attributes that overlaps the speech translation control information (such as gender and age), and prioritize the acquired speaker attributes for use in the speech recognition, later translation, or speech synthesis.

Next, the speech speaker attribute acquiring unit 304 acquires the speaking speed from the speech information "Ohayogozaimasu". Here, it is assumed that the speech speaker attribute acquiring unit 304 determined 4 syllables per seconds, and acquired the speaking speed "middle".

Next, the third model selection section 3072 searches the speech recognition model selection information management table (FIG. 14) for the record of "ID=18" by using one or more speaker attributes contained in the speech translation control information stored in the third speaker attribute storage unit 301 and one or more speaker attributes (here, speaking speed "middle") acquired by the speech speaker attribute acquiring unit 304, and acquires the speech recognition model identifier "JR6". Then, the third model selection section 3072 reads out the selected speech recognition model "JR6" from the speech recognition model storage unit 302.

The speech recognition unit 308 performs speech recognition processing on the received speech information by using the read speech recognition model, and acquires a speech recognition result "Ohayogozaimasu".

Next, the speech speaker attribute acquiring unit 304 requests speech recognition processing from the speech recognition unit 308, and obtains the speech recognition result "Ohayogozaimasu".

The speech speaker attribute acquiring unit 304 performs natural language processing on the acquired speech recognition result, and acquires the first speaker class "A" because of polite language. The speech speaker attribute acquiring unit 304 have stored therein, for example, terms such as "gozaimasu" and "desu" that constitute polite language, and terms of a high degree of difficulty such as "sogo ("disagreement" in Japanese)" and "gobyu ("mistake" in Japanese)," and may determine the first speaker class based on the frequency of appearance of those terms, proportion of appearance of those terms, or the like. The speech speaker attribute acquiring unit 304 performs morphological analysis on "Ohayogozaimasu", and divides it into two morphemes of "ohayo" and "gozaimasu". Then, the speech speaker attribute acquiring unit 304 detects that "gozaimasu" agrees with the managed term. Next, the speech speaker attribute acquiring unit 304 calculates the proportion of the managed terms to be "50%". Next, the speech speaker attribute acquiring unit 304 determines the first speaker class "A" based on stored determination conditions "A: the proportion of appearance of the managed terms being 5% or larger; B: the proportion of appearance of the managed terms being 1% or larger and less than 5%; C: the proportion of appearance of the managed terms being less than 1%". Note that it is preferable that as the conversation goes on, the speech speaker attribute acquiring unit 304 calculates the proportion of appearance of the managed terms and determines or changes the first speaker class as necessary.

Next, the third speaker attribute accumulation unit 305 adds the speaking speed "middle" and the first speaker class "A", which are the speaker attributes, to the received speech translation control information (FIG. 20). Then, the third speaker attribute accumulation unit 305 at least temporarily accumulates the speech translation control information of FIG. 21 in the third speaker attribute storage unit 301.

Next, the third server selection section 3092 searches the translation server selection information management table (FIG. 15) by using one or more speaker attributes contained in the speech translation control information (FIG. 21) stored in the third speaker attribute storage unit 301, and acquires the translation server identifier "77.128.50.80" in the record of "ID=25" corresponding to the one or more speaker attributes. Then, the third speaker attribute accumulation unit 305 adds the translation server identifier "77.128.50.80" to the speech translation control information and accumulates the speech translation control information in the third speaker attribute storage unit 301. The thus updated speech translation control information is shown in FIG. 22.

Next, the speech recognition result sending unit 310 sends the speech recognition result "Ohayogozaimasu" to the translation server 4 corresponding to the acquired translation server identifier "77.128.50.80".

Then, the third speaker attribute sending unit 311 sends the speech translation control information (FIG. 22) stored in the third speaker attribute storage unit 301 to the translation server 4 corresponding to the acquired translation server identifier "77.128.50.80".

Next, the speech recognition result receiving unit 406 in the translation server 4 receives the speech recognition result "Ohayogozaimasu". Then, the fourth speaker attribute receiving unit 403 receives the speech translation control information (FIG. 22).

Next, the fourth speaker attribute accumulation unit 405 at least temporarily accumulates the received speech translation control information (FIG. 22) in the fourth speaker attribute storage unit 401.

Next, the fourth model selection section 4072 searches the translation model selection information management table (FIG. 16) for the record of "ID=18" by using one or more speaker attributes contained in the speech translation control information of FIG. 22, and acquires the translation model identifier "JT4". Then, the fourth model selection section 4072 reads out the translation model "JT4" from the translation model storage unit 402.

Next, the translation unit 408 performs translation processing on the received speech recognition result "Ohayogozaimasu" by using the read translation model "JT4". Then, the translation unit 408 obtains the translation result "Good morning".

Next, the fourth server selection section 4092 searches the speech synthesis server selection information management table (FIG. 17) for the record of "ID=33" by using one or more speaker attributes contained in the speech translation control information of FIG. 22, and acquires the speech synthesis server identifier "238.3.55.7".

Then, the fourth speaker attribute accumulation unit 405 configures the speech translation control information (FIG. 23) by adding the speech synthesis server identifier "238.3.55.7" to the speech translation control information of FIG. 22, and accumulates this speech translation control information in the fourth speaker attribute storage unit 401.

Next, the translation result sending unit 410 sends the translation result "Good morning." to the speech synthesis server 5 corresponding to the speech synthesis server identifier "238.3.55.7".

Next, the fourth speaker attribute sending unit 411 sends the speech translation control information of FIG. 23 to the speech synthesis server 5 corresponding to the speech synthesis server identifier "238.3.55.7".

Next, the translation result receiving unit 505 in the speech synthesis server 5 receives the translation result. Also, the fifth speaker attribute receiving unit 503 receives the speech translation control information of FIG. 23.

Then, the fifth speaker attribute accumulation unit 504 at least temporarily accumulates the received speech translation control information in the fifth speaker attribute storage unit 501.

Next, the fifth model selection section 5062 searches the speech synthesis model selection information management table for the record of "ID=18" by using one or more speaker attributes contained in the speech translation control information (FIG. 23) stored in the fifth speaker attribute storage unit 501, and acquires the speech synthesis model identifier "JC9". Then, the fifth model selection section 5062 reads out the selected speech synthesis model "JC9" from the speech synthesis model storage unit 502.

Next, the speech synthesis unit 507 performs speech synthesis processing on the translation result "Good morning." by using the read speech synthesis model. Then, the speech synthesis unit 507 acquires speech-synthesized speech information (speech synthesis result).

Next, the speech synthesis result sending unit 508 sends the acquired speech synthesis result to the second terminal apparatus 2.

Next, the second speech receiving unit 27 in the second terminal apparatus 2 receives the speech synthesis result "Good morning". Then, the second speech output unit 28 outputs the speech "Good morning".

With the above-described procedure, "Ohayogozaimasu" uttered by the user A is converted into the speech "Good morning" before reaching the second terminal apparatus 2, and "Good morning" is output to the second terminal apparatus 2.

Also, the speech "Good morning" uttered by the user B of the second terminal apparatus 2 in response to "Good morning" is converted into "Ohayo" with the same procedure as described above, and the speech "Ohayo" is output to the first terminal apparatus 1.

As described above, according to the present embodiment, an appropriate apparatus or appropriate model that matches speaker attributes can be selected in each processing of speech recognition, translation, and speech synthesis. As a result, a network-type speech translation system with high accuracy, or which inherits speaker's attributes, can be provided.

Furthermore, according to the present embodiment, if speaker attributes such as speaking speed and speaker class vary during conversation, the apparatus (each of the apparatuses for speech recognition, translation, and speech synthesis) or the model (each of the models for speech recognition, translation, and speech synthesis) according to this variation are applied, and the processing of speech recognition, translation, speech synthesis, and the like can be performed appropriately.

Note that according to the present embodiment, all appropriate apparatus or appropriate model that matches speaker attributes can be selected in each processing of speech recognition, translation, and speech synthesis. However, only the apparatus or the model for performing speech recognition may be selected, or only the apparatus or the model for performing translation may be selected, or only the apparatus or the model for performing speech synthesis may be selected.

Furthermore, according to the present embodiment, if, for example, the user designates a translation server or a translation model, it is preferable to perform translation processing by using the designated translation server or translation model. This is because in some cases the user wants to use a translation server or a translation model in which the expressions the user wants to use are accumulated. In this case, for example, the first terminal apparatus 1 has stored therein a translation server identifier or a translation model identifier respectively for identifying the translation server or the translation model the user wants to use. Such translation server identifier or translation model identifier is added to the speech translation control information. Then, such speech translation control information is sent from the first terminal apparatus 1 via the speech recognition server 3 to the translation server 4.

Similarly, in the present embodiment, if, for example, the user designates a speech synthesis server or a speech synthesis model, it is preferable to perform speech synthesis processing by using the designated speech synthesis server or speech synthesis model. This is because in some cases the user wants to use a speech synthesis model in which the user's own speeches are collected, or a speech synthesis server that has stored a speech synthesis model in which the user's own speeches are collected, to perform speech synthesis into the target language. In this case, for example, the first terminal apparatus 1 has stored therein a speech synthesis server identifier or a speech synthesis model identifier respectively for identifying the speech synthesis server or the speech synthesis model the user wants to use. Such speech synthesis server identifier or speech synthesis model identifier is added to the speech translation control information. Then, such speech translation control information is sent from the first terminal apparatus 1 to the speech synthesis server 5 via the speech recognition server 3 and the translation server 4.

FIG. 24 is an example of the speech translation control information to which information for identifying a translation server designated by a user and information for identifying the speech synthesis server designated by the user are added.

Further, according to the present embodiment, the first terminal apparatus 1 performs processing for selecting the speech recognition server 3. Also, the speech recognition server 3 performs processing for selecting the speech recognition model and processing for selecting the translation server 4. Also, the translation server 4 performs processing for selecting the translation model and processing for selecting the speech synthesis server 5. Also, the speech synthesis server 5 performs processing for selecting the speech synthesis model. However, such processing for selecting those models or servers may be performed by other apparatuses. For example, a conceptual diagram of a speech translation system 6 in which a control unit performs such processing for selecting servers is shown in FIG. 25. Referring to FIG. 25, the speech translation system includes one or more first terminal apparatuses 251, one or more second terminal apparatuses 252, one or more speech recognition servers 253, one or more translation servers 254, one or more speech synthesis servers 5, and a control unit 256. The difference between this speech translation system 6 and the above-described speech translation system is a difference that arises since the apparatus that performs server selection processing is different. Note that in FIG. 25, model selection is performed respectively by the speech recognition server 253, the translation server 254, and the speech synthesis server 5.

Also, in FIG. 25, the first terminal apparatus 251, the second terminal apparatus 252, the speech recognition server 253, the translation server 254, and the speech synthesis server 5 respectively receive a result before processing from the control unit 256, and send a result after processing to the control unit 256. That is, the first terminal apparatus 251 sends speech information accepted from the user A to the control unit 256. Then, the control unit 256 determines the speech recognition server 253 for performing speech recognition, and sends the speech information to the speech recognition server 253. Next, the speech recognition server 253 receives the speech information, selects the speech recognition model as necessary, and performs speech recognition processing. Then, the speech recognition server 253 sends a speech recognition result to the control unit 256. Next, the control unit 256 receives the speech recognition result from the speech recognition server 253, and selects the translation server 254 for performing translation. Then, the control unit 256 sends the speech recognition result to the selected translation server 254. Next, the translation server 254 receives the speech recognition result, selects the translation model as necessary, and performs translation processing. Then, the translation server 254 sends a translation result to the control unit 256. Next, the control unit 256 receives the translation result from the translation server 254, and selects the speech recognition server 5 for performing speech recognition. Then, the control unit 256 sends the translation result to the selected speech recognition server 5. Next, the speech synthesis server 5 receives the translation result, selects the speech synthesis model as necessary, and performs speech synthesis processing. Then, the speech synthesis server 5 sends a speech synthesis result to the control unit 256. Next, the control unit 256 receives the speech synthesis result from the speech synthesis server 5, and sends the result to the second terminal apparatus 252. Next, the second terminal apparatus 252 receives and outputs the speech synthesis result.

FIG. 26 is a block diagram of the speech translation system 6. In FIG. 26, the device to/from which the first speech sending unit 16, the first speech receiving unit 17, and the first speaker attribute sending unit 19 in the first terminal apparatus 251, and the second speech sending unit 26, the second speech receiving unit 27, and the second speaker attribute sending unit 29 in the second terminal apparatus 252 transmit/receive information is the control unit 256.

Referring to FIG. 26 the first terminal apparatus 251 includes a first speaker attribute storage unit 11, a first speaker attribute accepting unit 12, a first speaker attribute accumulation unit 13, a first speech accepting unit 14, a first speech sending unit 16, a first speech receiving unit 17, a first speech output unit 18, and a first speaker attribute sending unit 19. The second terminal apparatus 252 includes a second speaker attribute storage unit 21, a second speaker attribute accepting unit 22, a second speaker attribute accumulation unit 23, a second speech accepting unit 24, a second speech sending unit 26, a second speech receiving unit 27, a second speech output unit 28, and a second speaker attribute sending unit 29.

FIG. 27 is a block diagram of the control unit 256. The control unit 256 includes a speaker attribute storage unit 2561, a sending and receiving unit 2562, a speaker attribute accumulation unit 2563, a second speech recognition server selection unit 25, a translation server selection unit 309, and a speech recognition server selection unit 409. The speaker attribute storage unit 2561 can have stored therein one or more speaker attributes. The speaker attribute storage unit 2561 may have stored therein speech translation control information. The sending and receiving unit 2562 transmits and receives various kinds of information to/from the first terminal apparatus 251, the second terminal apparatus 252, the speech recognition server 253, the translation server 254, and the speech synthesis server 5. Various kinds of information refer to speech information, speech recognition results, translation results, speech synthesis results, speech translation control information (including a part of speaker attributes), and the like. The sending and receiving unit 2562 can generally be realized by wireless or wired communication means. The speaker attribute accumulation unit 2563 accumulates, in the speaker attribute storage unit 2561, one or more speaker attributes (which may alternatively be the speech translation control information) received by the sending and receiving unit 2562.

FIG. 28 is a block diagram of the speech recognition server 253. The speech recognition server 253 includes a third speaker attribute storage unit 301, a speech recognition model storage unit 302, a third speaker attribute receiving unit 303, a speech speaker attribute acquiring unit 304, a third speaker attribute accumulation unit 305, a speech information receiving unit 306, a speech recognition model selection unit 307, a speech recognition unit 308, a speech recognition result sending unit 310, and a third speaker attribute sending unit 311.

FIG. 29 is a block diagram of the translation server 254. The translation server 254 includes a fourth speaker attribute storage unit 401, a translation model storage unit 402, a fourth speaker attribute receiving unit 403, a fourth speaker attribute accumulation unit 405, a speech recognition result receiving unit 406, a translation model selection unit 407, a translation unit 408, a translation result sending unit 410, and a fourth speaker attribute sending unit 411.

Also, in the present embodiment, an example of the speech translation control information has been described using FIG. 20 to FIG. 24. However, there is no restriction to the format of the speech translation control information. Needless to say, the speech translation control information may be in an XML format as shown in FIG. 30. The description language of the speech translation control information shown in FIG. 30 is called speech translation markup language, or STML. Referring to FIG. 30, a user ID (information "Mike" for identifying a speaking user), a format or size (MaxNBest="2") of an output result of speech recognition, a source language "English" (language="en"), information for identifying a translation target (here, Task="Dictation"), a conversation domain (here, "Travel"), and information indicating an input speech format (here, "ADPCM") are described. Also, in FIG. 30, among speaker attributes the gender (here, "male"), the age (here, "30"), and whether being a native or not (here, "no") are described. Also, in FIG. 30, information indicating the output text format (here, "SurfaceForm") is described. Also, the speech translation control information may also include information indicating the output speech format, information for designating the voice quality of input/output speech, and information indicating the format of input text, and the like. The above-mentioned (MaxNBest="2") indicates that the top two candidates of the speech recognition result are output and sent. Note that "Nbest" means the top N candidates of the speech recognition result.

Also, in the present embodiment, the speech recognition server 3 and the translation server 4 do not have to select the speech recognition model or the translation model, respectively. Also, selection of the speech recognition server 3 for performing speech recognition processing or the translation server 4 for performing translation processing does not have to be performed. In this case, selection of the speech synthesis server 5 or selection of the speech synthesis model is performed in accordance with speaker attributes. Such processing for selecting the speech synthesis server 5 and processing for selecting the speech synthesis model are as described above. The speech synthesis unit 507 in the speech synthesis server 5 may configure speech information to be output by converting speech in accordance with speaker attributes (e.g., speaking speed, pitch of tone, tone quality, etc.). That is, the speech synthesis unit 507 may perform speech synthesis on the translation result received by the translation result receiving unit 505 by using the speech synthesis model in the speech synthesis model storage unit 502 so as to match the attributes indicated by one or more speaker attributes received by the fifth speaker attribute receiving unit 503, and thus acquire a speech synthesis result. Also, the speech synthesis unit 507 may perform speech synthesis on the translation result received by the translation result receiving unit 505 by using the speech synthesis model in the speech synthesis model storage unit 52 so as to match the attributes indicated by the speaker attributes in the speech translation control information, and thus acquire a speech synthesis result. This case may also be referred to as speech synthesis model selection.

Furthermore, the processing in the present embodiment may be realized by software. Such software may further be distributed by downloading of software product or the like. In addition, such software may be recorded on a recording medium such as a CD-ROM and distributed. Note that this applies to other embodiments of the present specification as well. Software that realizes the first terminal apparatus of the present embodiment may be a program as described below. That is, this program is a program for causing a computer to function as: a first speech accepting unit that accepts speech; a first speech recognition server selection unit that selects a speech recognition server from among two or more speech recognition servers in accordance with one or more speaker attributes stored in a storage medium; and a first speech sending unit that sends speech information constituted from the speech accepted by the first speech accepting unit to the speech recognition server selected by the first speech recognition server selection unit.

Also, the software that realizes the speech recognition server in the present embodiment is a program for causing a computer to function as: a speech information receiving unit that receives speech information; a speech recognition model selection unit that selects a speech recognition model from among two or more speech recognition models stored in a recording medium in accordance with one or more speaker attributes stored in a recording medium; a speech recognition unit that performs speech recognition on the speech information received by the speech information receiving unit by using the speech recognition model selected by the speech recognition model selection unit, and acquires a speech recognition result; and a speech recognition result sending unit that sends the speech recognition result.

Also, the software that realizes the speech recognition server in the present embodiment is a program for causing a computer to function as: a speech information receiving unit that receives speech information; a speech recognition unit that performs speech recognition on the speech information received by the speech information receiving unit by using a speech recognition model stored in a recording medium, and acquires a speech recognition result; a translation server selection unit that selects a translation server from among two or more translation servers in accordance with one or more speaker attributes stored in a recording medium; and a speech recognition result sending unit that sends the speech recognition result to the translation server selected by the translation server selection unit.

Also, the software that realizes the speech recognition server in the present embodiment is a program for causing a computer to function further as: a speech speaker attribute acquiring unit that acquires one or more speaker attributes related to speech from the speech information received by the speech information receiving unit; and a third speaker attribute accumulation unit that accumulates, in a recording medium, one or more speaker attributes acquired by the speech speaker attribute acquiring unit.

Also, the software that realizes the translation server in the present embodiment is a program for causing a computer to function as: a fourth speaker attribute receiving unit that receives one or more speaker attributes; a speech recognition result receiving unit that receives a speech recognition result; a translation model selection unit that selects a translation model from among two or more translation models stored in a recording medium in accordance with one or more speaker attributes received by the fourth speaker attribute receiving unit; a translation unit that translates into a target language the speech recognition result received by the speech recognition result receiving unit by using the translation model selected by the translation model selection unit, and acquires a translation result; and a translation result sending unit that sends the translation result.

Also, the software that realizes the translation server in the present embodiment is a program for causing a computer to function further as: a fourth speaker attribute receiving unit that receives one or more speaker attributes; a speech recognition result receiving unit that receives a speech recognition result; a translation unit that translates into a target language the speech recognition result received by the speech recognition result receiving unit by using a translation model stored in a recording medium, and acquires a translation result; a speech synthesis server selection unit that selects a speech synthesis server from among two or more speech synthesis servers in accordance with the one or more speaker attributes; and a translation result sending unit that sends the translation result to the speech synthesis server selected by the speech synthesis server selection unit.

Also, the software that realizes the translation server in the present embodiment is a program for causing a computer to function further as: a language speaker attribute acquiring unit that acquires one or more speaker attributes related to one or more languages from the speech recognition result received by the speech recognition result receiving unit; and a fourth speaker attribute accumulation unit that accumulates, in a recording medium, one or more speaker attributes acquired by the language speaker attribute acquiring unit.

Also, the software that realizes the speech synthesis server in the present embodiment is a program for causing a computer to function further as: a fifth speaker attribute receiving unit that receives one or more speaker attributes; a translation result receiving unit that receives a translation result; a speech synthesis model selection unit that selects a speech synthesis model from among two or more speech synthesis models stored in a recording medium in accordance with one or more speaker attributes received by the fifth speaker attribute receiving unit; a speech synthesis unit that performs speech synthesis on the translation result received by the translation result receiving unit by using the speech synthesis model selected by the speech synthesis model selection unit, and acquires a speech synthesis result; and a speech synthesis result sending unit that sends the speech synthesis result to a second terminal apparatus.

FIG. 31 shows the external appearance of a computer that realizes the speech translation system and the like in the foregoing embodiments by executing the programs described in the present specification. The foregoing embodiments may be realized using computer hardware and a computer program executed thereon. FIG. 31 is a schematic diagram of this computer system 340, and FIG. 32 is a diagram showing an internal configuration of the computer system 340.

In FIG. 31, the computer system 340 includes a computer 341 including an FD drive 3411 and a CD-ROM drive 3412, a keyboard 342, a mouse 343, and a monitor 344.

In FIG. 32, the computer 341 includes not only the FD drive 3411 and the CD-ROM drive 3412, but also an MPU 3413, a bus 3414 connected to the CD-ROM drive 3412 and the FD drive 3411, a RAM 3416 connected to a ROM 3415 for storing a program such as a startup program for temporarily storing a command of an application program and for providing a temporary storage area, and a hard disk 3417 for storing an application program, a system program, and data. Although not shown, the computer 341 may further include a network card that provides connection to a LAN.

The program for causing the computer system 340 to execute the functions of the speech translation system or the like in the foregoing embodiments may be stored in a CD-ROM 3501 or a FD 3502, which may be inserted into the CD-ROM drive 3412 or the FD drive 3411 and transferred to the hard disk 3417. Alternatively, the program may be sent to the computer 341 via a network (not shown) and stored in the hard disk 3417. At the time of execution, the program is loaded into the RAM 3416. The program may be loaded from the CD-ROM 3501 or the FD 3502, or directly from the network.

The program does not necessarily have to include, for example, an operating system (OS), a third party program, or the like to cause the computer 341 to execute the functions of the speech translation system or the like in the foregoing embodiments. The program may only include a portion of commands capable of calling an appropriate function (module) in a controlled mode and obtaining desired results. The manner in which the computer system 340 operates is well known, and therefore a detailed description thereof is omitted.

It should be noted that, in the above-described program, processes performed by hardware (processes performed only by hardware), for example, a process performed by a modem or an interface card in the step of sending is not included in the step of sending information, the step of receiving information, and the like.

Furthermore, the computer that executes the above-described program may be a single computer, or may be multiple computers. More specifically, centralized processing may be performed, or distributed processing may be performed.

Furthermore, in the foregoing embodiments, needless to say, two or more communication means (the speech recognition result receiving unit and the fourth speaker attribute receiving unit, for example) provided in a single apparatus may be realized by a physically single medium.

Furthermore, in the foregoing embodiments, each process (each function) may be realized as an integrated process using a single apparatus (system), or may be realized as a distributed process using multiple apparatuses. Note that in the case where each processing (each function) is intensively performed by a single apparatus (system), the speech translation system is a single apparatus, and the speech recognition server, the translation server, and the speech synthesis server are contained in the single apparatus. In this case, the above-described sending and receiving of information is exchange of information. That is, the above-described sending and receiving are broadly interpreted.

More specifically, if the speech translation system is intensively processed with a single apparatus, this speech translation system has, for example, a configuration shown in FIG. 33.

That is, the speech translation system includes a speech accepting unit 3301, a third speaker attribute storage unit 301, a speech recognition model storage unit 302, a speech speaker attribute acquiring unit 304, a speech recognition model selection unit 307, a speech recognition unit 308, a translation model storage unit 402, a language speaker attribute acquiring unit 404, a translation model selection unit 407, a translation unit 408, a speech synthesis model storage unit 502, a speech synthesis model selection unit 506, a speech synthesis unit 507, and a speech synthesis result output unit 3302.

The speech accepting unit 3301 accepts speech from a user. This speech is speech of a speech translation target. The speech accepting unit 3301 can be realized by, for example, a microphone, a device driver thereof, and the like.

Here, the third speaker attribute storage unit 301 generally has stored therein speaker attributes accepted from the user. The speaker attributes here generally are static speaker attribute information.

The speech speaker attribute acquiring unit 304 acquires one or more speech speaker attributes from the speech information configured from the speech accepted by the speech accepting unit 3301. The speech speaker attributes acquired here are mainly dynamic speaker attribute information, but may also be static speaker attribute information.

The speech recognition model selection unit 307 selects a speech recognition model from among two or more speech recognition models in accordance with one or more speaker attributes among the speaker attributes in the third speaker attribute storage unit 301 or the speaker attributes acquired by the speech speaker attribute acquiring unit 304.

The speech recognition unit 308 performs, by using the speech recognition model of the speech recognition model storage unit 302, speech recognition on the speech information configured from the speech accepted by the speech accepting unit 3301, and acquires a speech recognition result. It is preferable that the speech recognition unit 308 performs, by using the speech recognition model selected by the speech recognition model selection unit 307, speech recognition on the speech information, and acquires the speech recognition result.

The language speaker attribute acquiring unit 404 acquires one or more language speaker attributes from the speech recognition result acquired by the speech recognition unit 308.

The translation model selection unit 407 selects a translation model from among two or more translation models in accordance with one or more speaker attributes. The speaker attributes here are one or more speaker attributes among the speaker attributes in the third speaker attribute storage unit 301, or the speaker attributes acquired by the speech speaker attribute acquiring unit 304, or the language speaker attributes acquired by the language speaker attribute acquiring unit 404.

The translation unit 408 translates the speech recognition result into the target language by using the translation model of the translation model storage unit 402, and acquires a translation result. It is preferable that the translation unit 408 translates the speech recognition result into the target language by using the translation model selected by the translation model selection unit 407, and acquires a translation result.

The speech synthesis model selection unit 506 selects a speech recognition model from among two or more speech recognition models in accordance with one or more speaker attributes. The speaker attributes here are one or more speaker attributes among the speaker attributes in the third speaker attribute storage unit 301, or the speaker attributes acquired by the speech speaker attribute acquiring unit 304, or the language speaker attributes acquired by the language speaker attribute acquiring unit 404.

The speech synthesis unit 507 performs speech synthesis on the translation result by using the speech synthesis model in the speech synthesis model storage unit 502, and acquires a speech synthesis result. It is preferable that the speech synthesis unit 507 performs speech synthesis on the translation result by using the speech synthesis model selected by the speech synthesis model selection unit 506, and acquires a speech synthesis result.

The speech synthesis result output unit 3302 outputs a speech synthesis result acquired by the speech synthesis unit 507. The output here is a concept including speech output using a speaker or the like, sending to an external apparatus (generally, a speech output apparatus), accumulation into a recording medium, delivery of a processing result to other processing apparatus or other program, and the like. The speech synthesis result output unit 3302 can be realized by a speaker, driver software thereof, and the like.

Note that in the speech translation system, the third speaker attribute storage unit 301, the speech speaker attribute acquiring unit 304, the speech recognition model selection unit 307, the language speaker attribute acquiring unit 404, the translation model selection unit 407, and the speech synthesis model selection unit 506 are not essential components.

The present invention is not limited to the embodiments set forth herein, and various modifications are possible. Needless to say, such modifications are also embraced in the scope of the present invention.

INDUSTRIAL APPLICABILITY

As described above, the speech translation system according to the present invention can change, in speech translation, the apparatus or model for performing speech recognition, translation, and speech synthesis in accordance with speaker attributes, thus has an effect of improving processing accuracy of speech recognition, translation, and speech synthesis and allowing appropriate output to be performed, and is useful as a speech translation system or the like.

BRIEF DESCRIPTION OF THE DRAWINGS

FIG. 11 shows a first speaker attribute management table of Embodiment 1.

FIG. 12 shows a second speaker attribute management table of Embodiment 1.

FIG. 13 shows a speech recognition server selection information management table of Embodiment 1.

FIG. 14 shows a speech recognition model selection information management table of Embodiment 1.

FIG. 15 shows a translation server selection information management table of Embodiment 1.

FIG. 16 shows a translation model selection information management table of Embodiment 1.

FIG. 17 shows a speech synthesis server selection information management table of Embodiment 1.

FIG. 18 shows a speech synthesis model selection information management table of Embodiment 1.

FIG. 19 shows an input screen of speaker attributes and the like in the first terminal apparatus of Embodiment 1.

FIG. 20 shows an example of speech translation control information of Embodiment 1.

FIG. 21 shows an example of updated speech translation control information of Embodiment 1.

FIG. 22 shows an example of updated speech translation control information of Embodiment 1.

FIG. 23 shows an example of updated speech translation control information of Embodiment 1.

FIG. 24 shows an example of updated speech translation control information of Embodiment 1.

FIG. 30 shows an example of STML which is an example of the speech translation control information of Embodiment 1.

Figure 1:
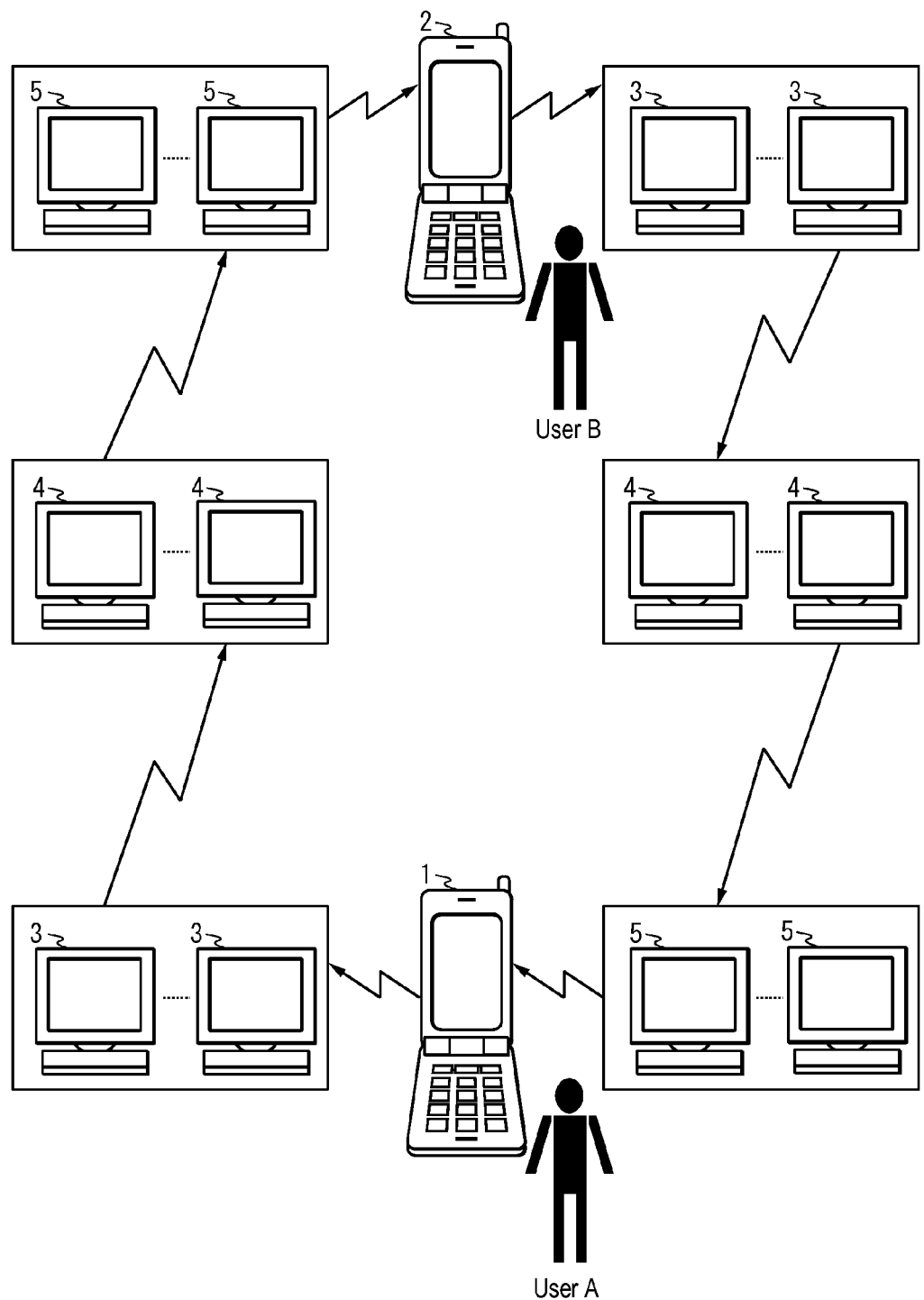
FIG. 1 is a conceptual diagram of a speech translation system of Embodiment 1.
Figure 2:
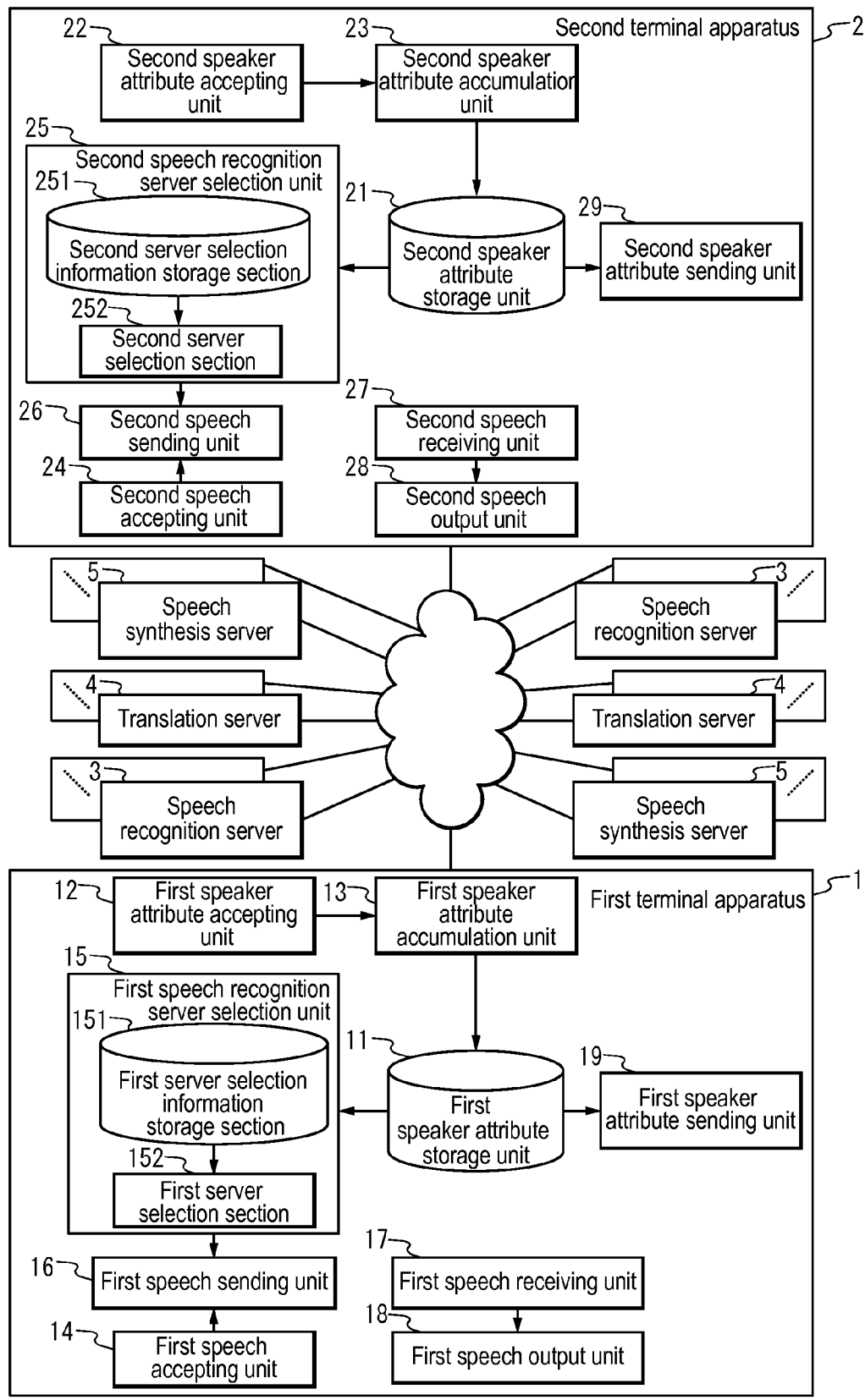
FIG. 2 is a block diagram of the speech translation system of Embodiment 1.
Figure 3:
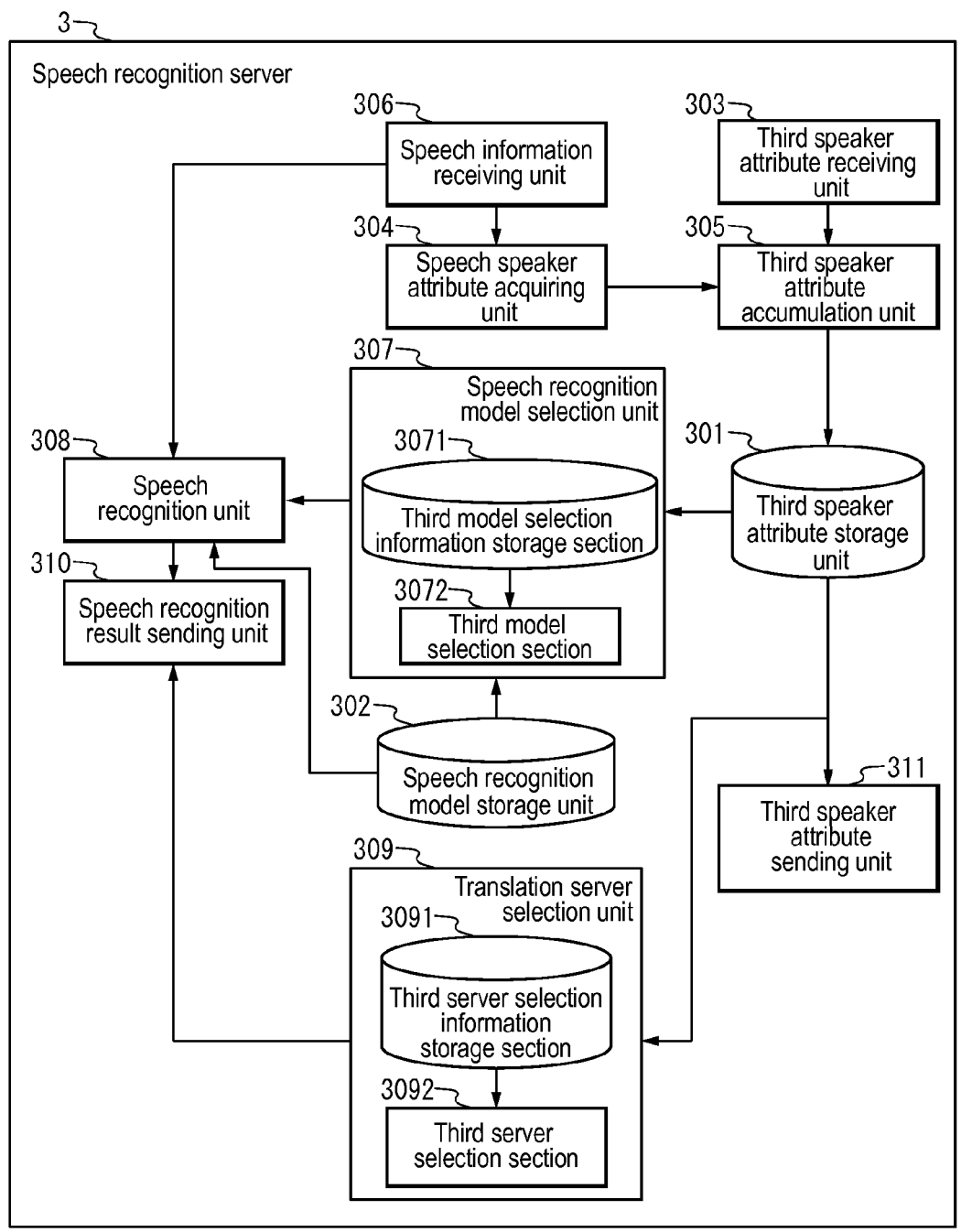
FIG. 3 is a block diagram of a speech recognition server of Embodiment 1.
Figure 4:
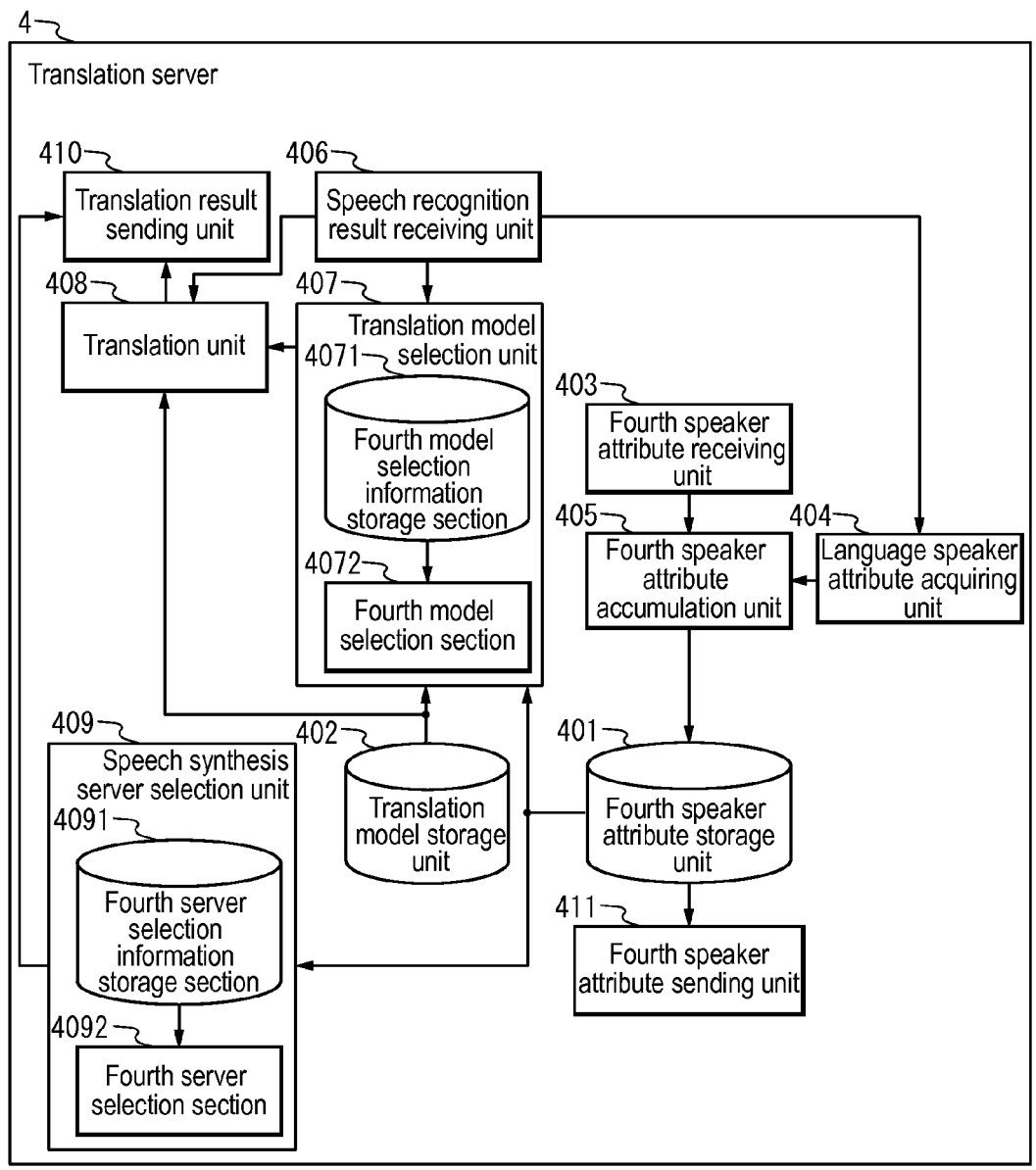
FIG. 4 is a block diagram of a translation server of Embodiment 1.
Figure 5:
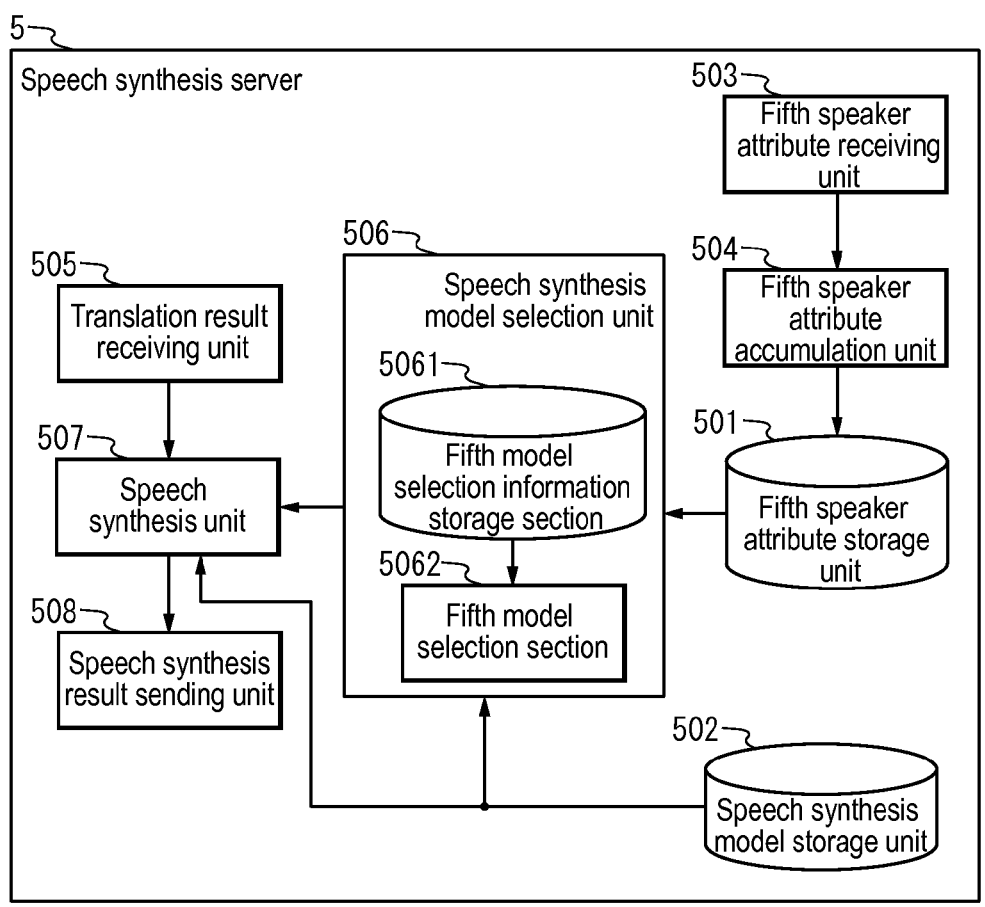
FIG. 5 is a block diagram of a speech synthesis server of Embodiment 1.
Figure 6:
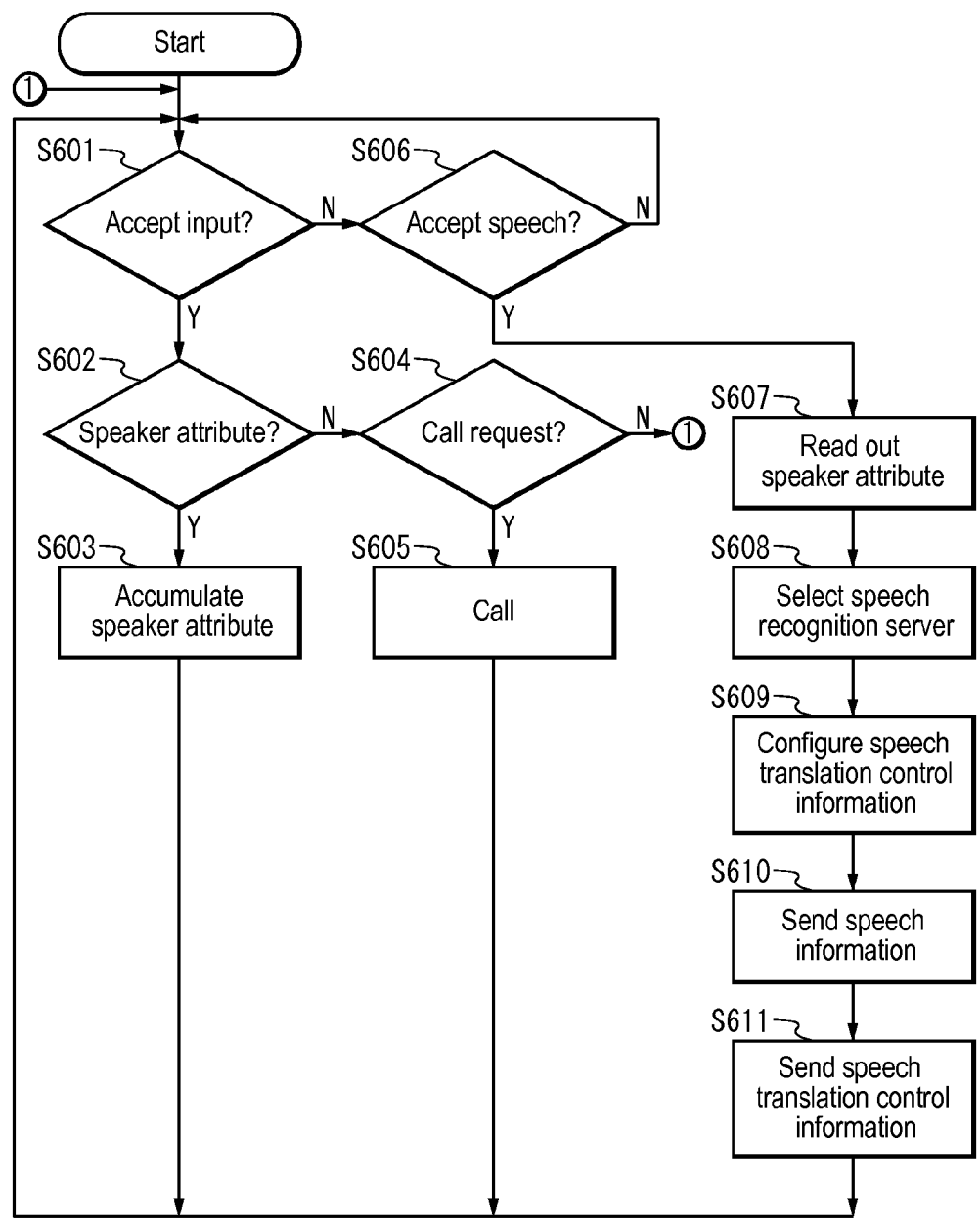
FIG. 6 is a flowchart illustrating an operation of the speech translation system of Embodiment 1.
Figure 7:
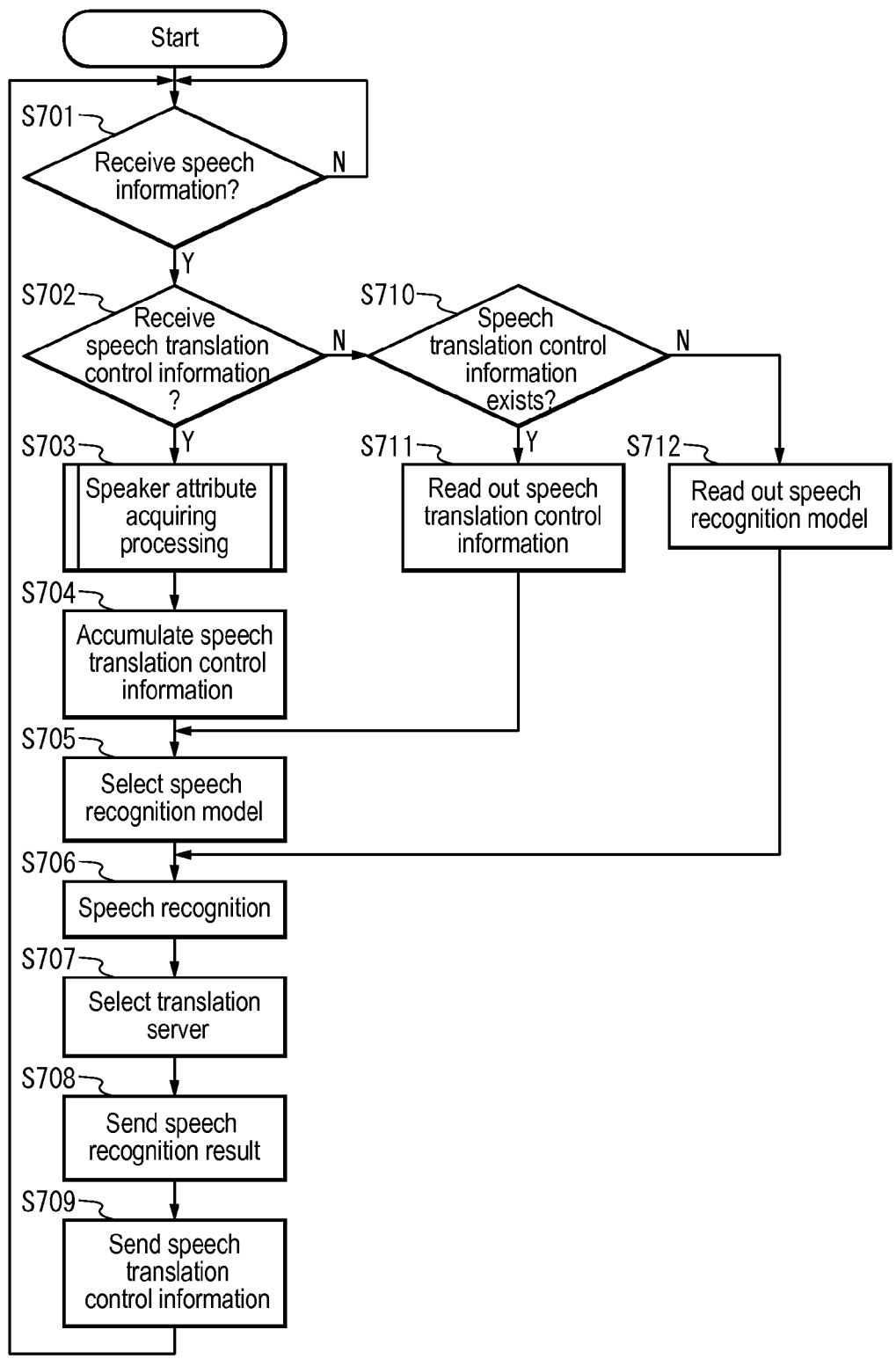
FIG. 7 is a flowchart illustrating an operation of the speech recognition server of Embodiment 1.
Figure 8:
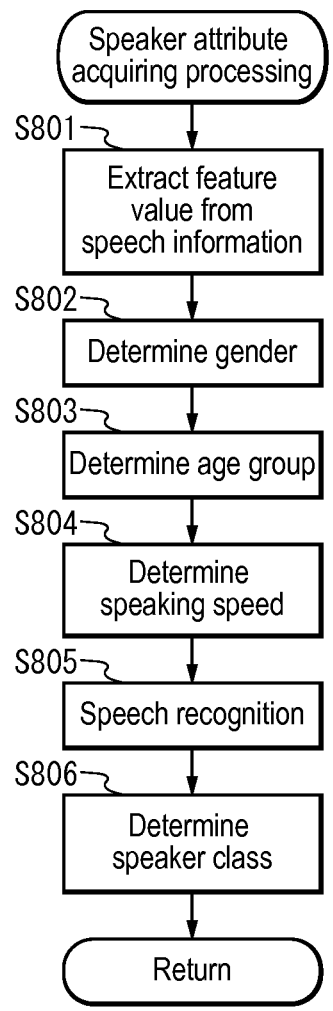
FIG. 8 is a flowchart illustrating an operation of the speaker attribute acquiring processing of Embodiment 1.
Figure 9:
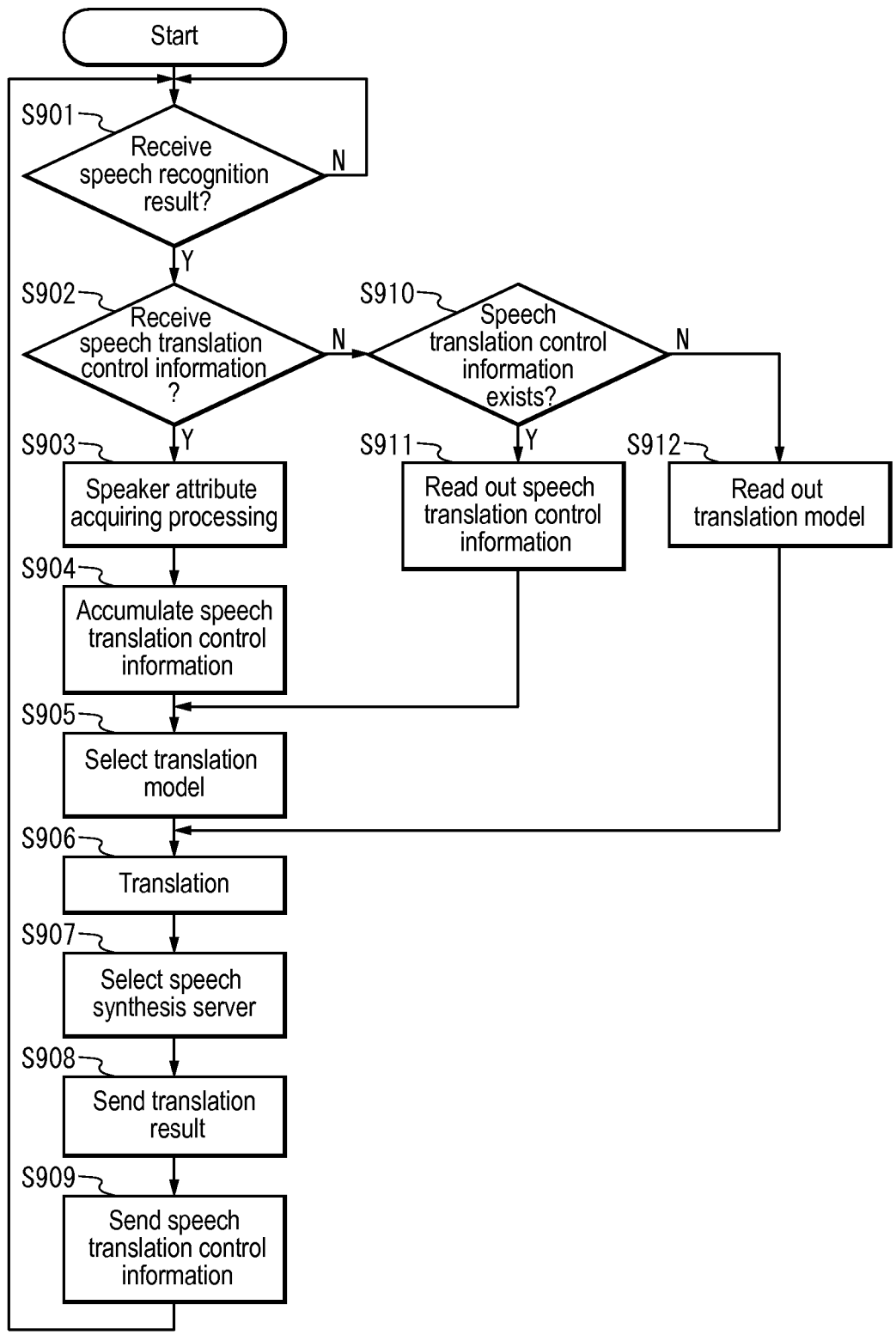
FIG. 9 is a flowchart illustrating an operation of the translation server of Embodiment 1.
Figure 10:
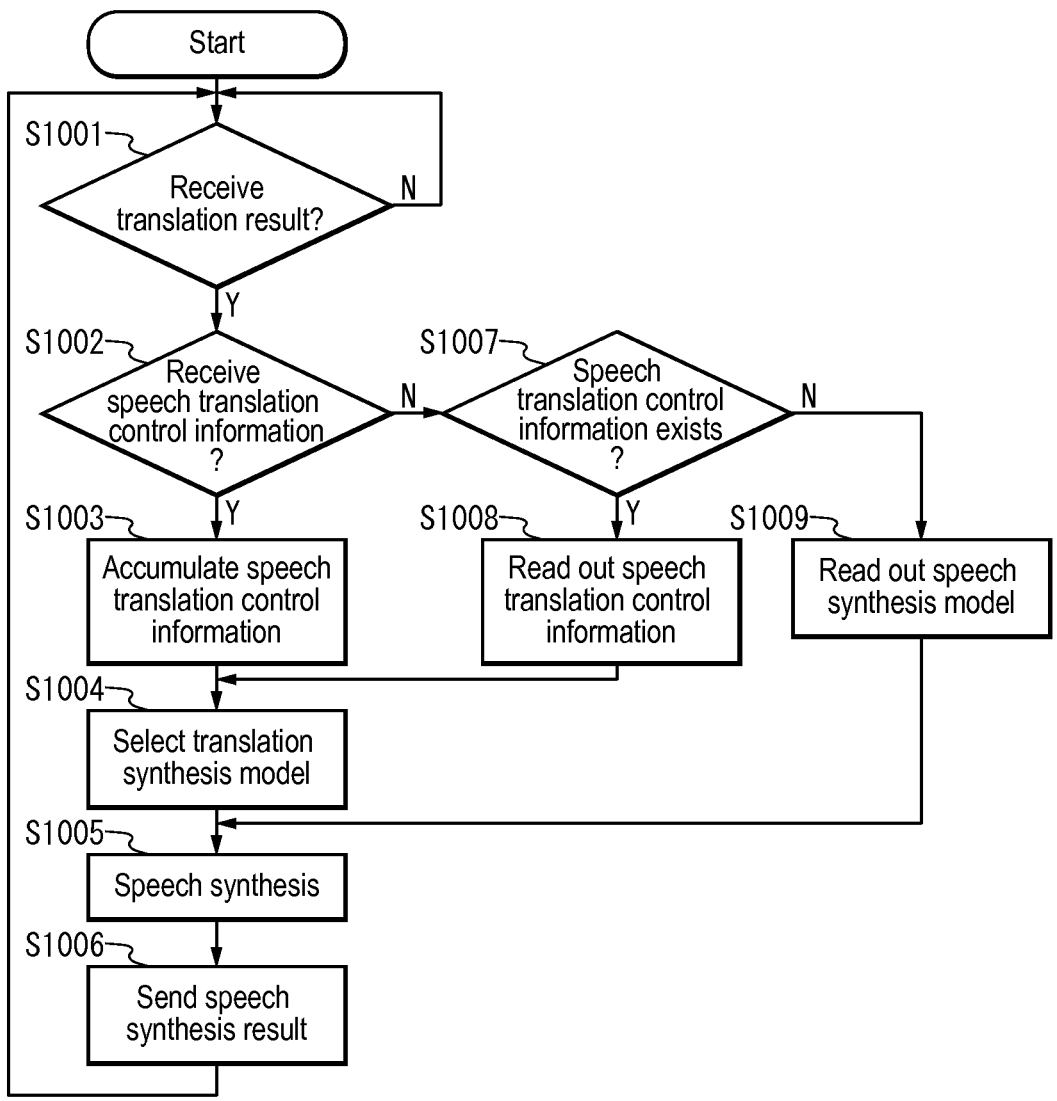
FIG. 10 is a flowchart illustrating an operation of the speech translation system of Embodiment 1.
Figure 25:
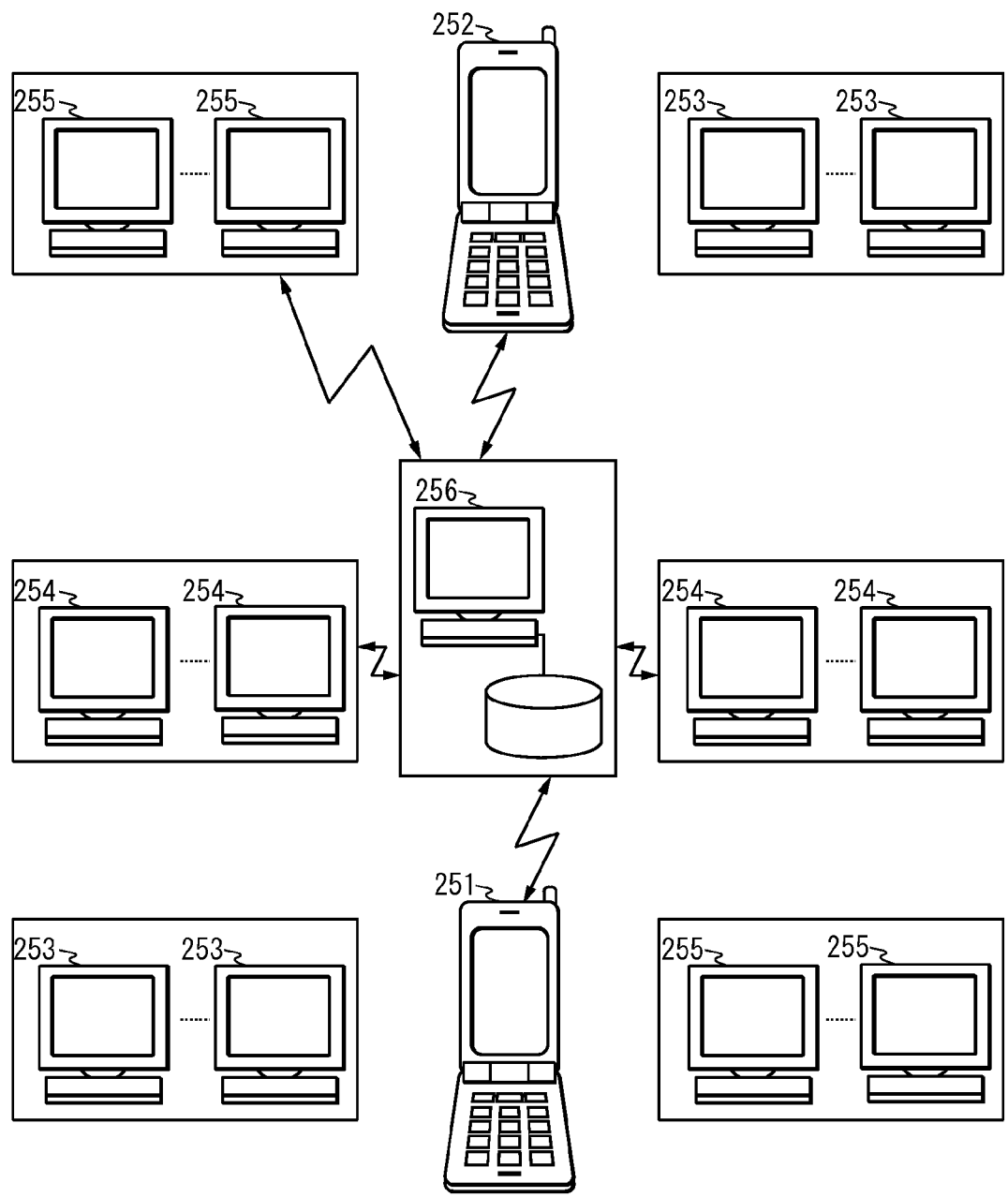
FIG. 25 is a conceptual diagram of another speech translation system of Embodiment 1.
Figure 26:
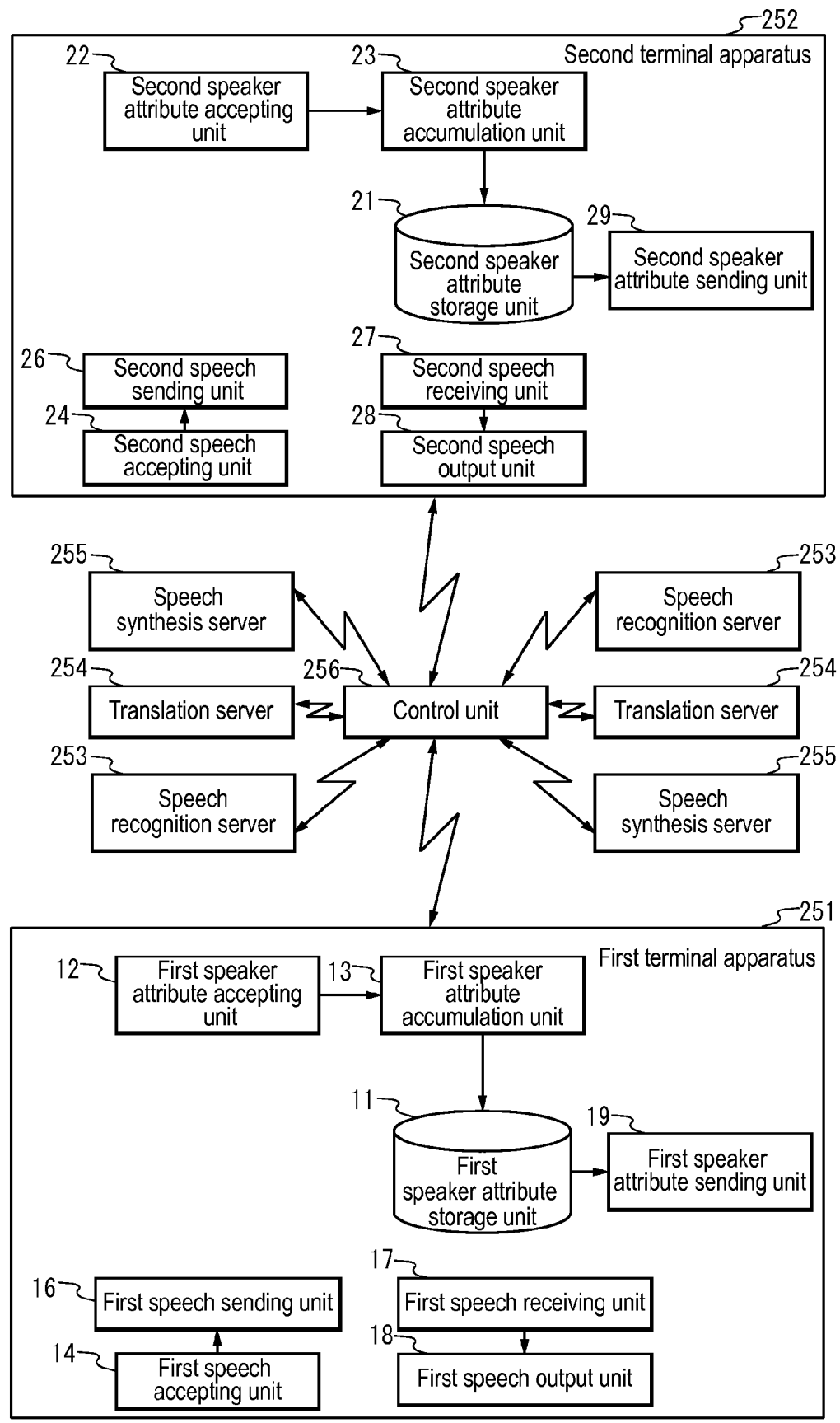
FIG. 26 is a block diagram of another speech translation system of Embodiment 1.
Figure 27:
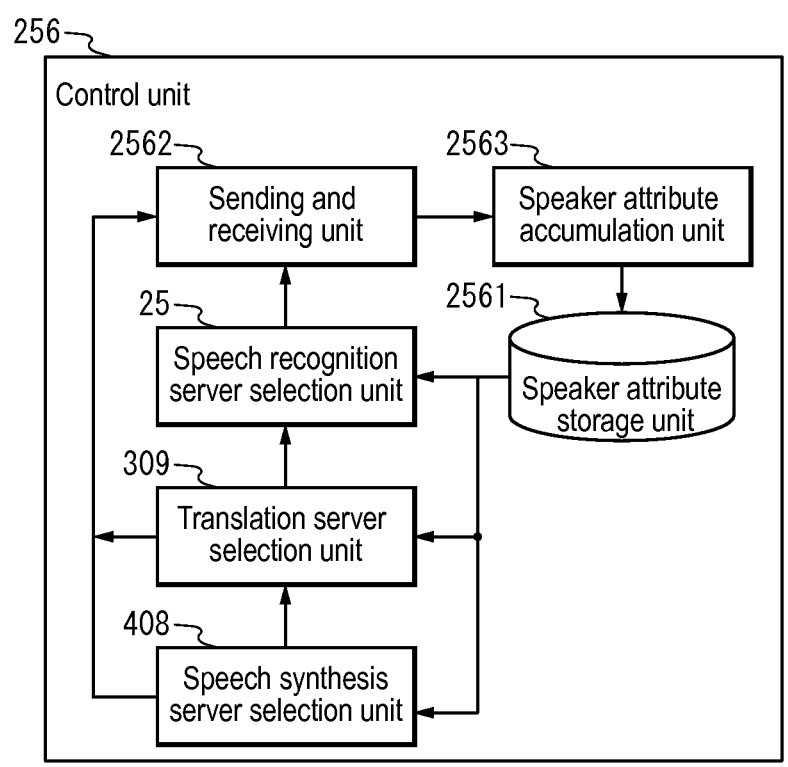
FIG. 27 is a block diagram of a control unit of Embodiment 1.
Figure 28:
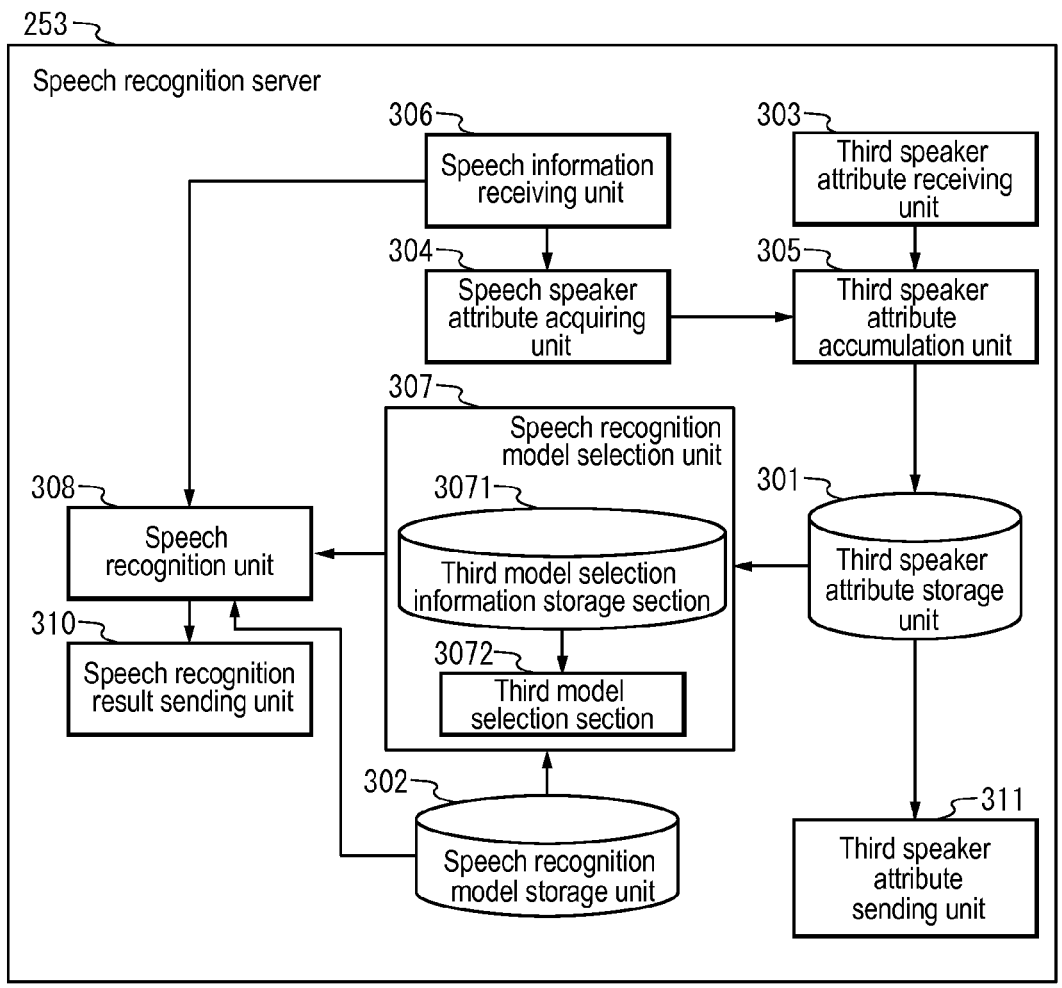
FIG. 28 is a block diagram of a speech recognition server of Embodiment 1.
Figure 29:
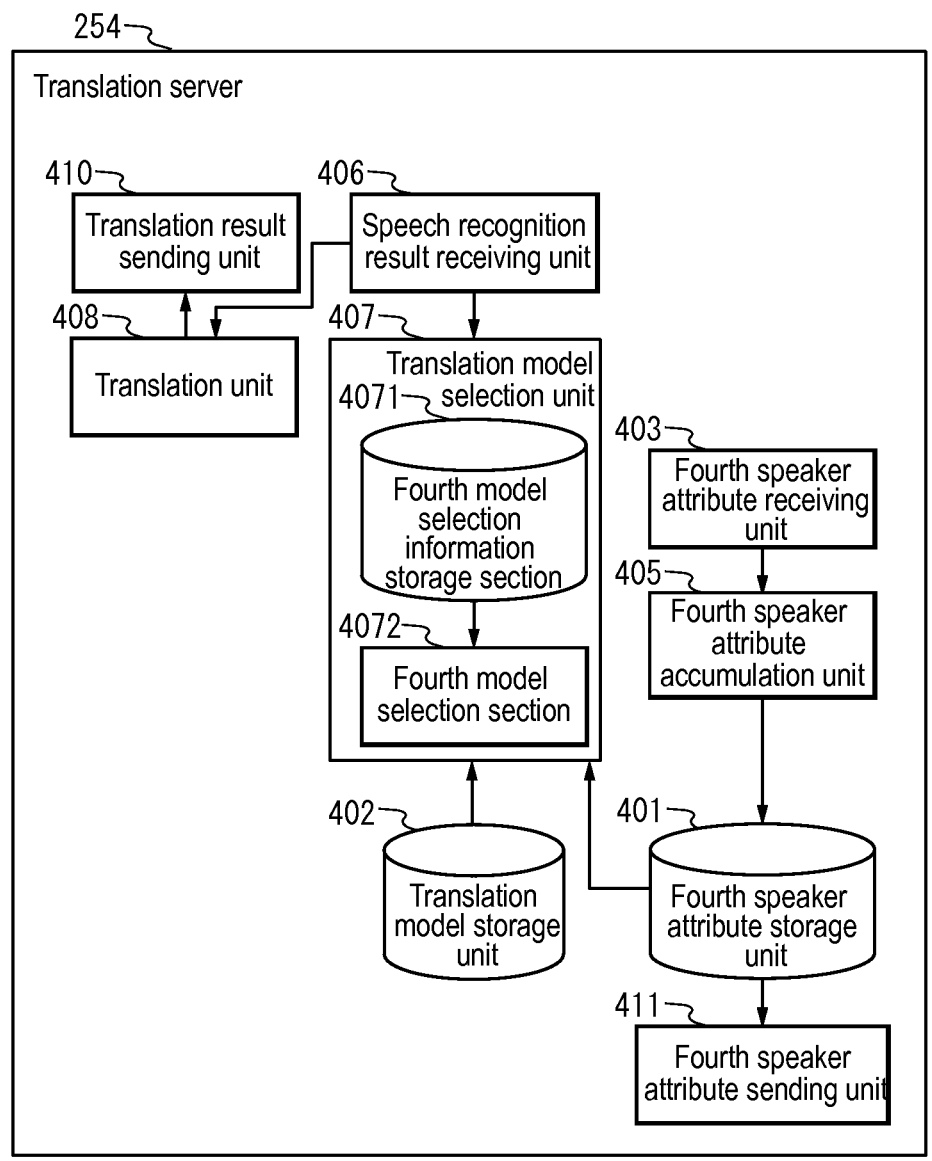
FIG. 29 is a block diagram of a translation server of Embodiment 1.
Figure 31:
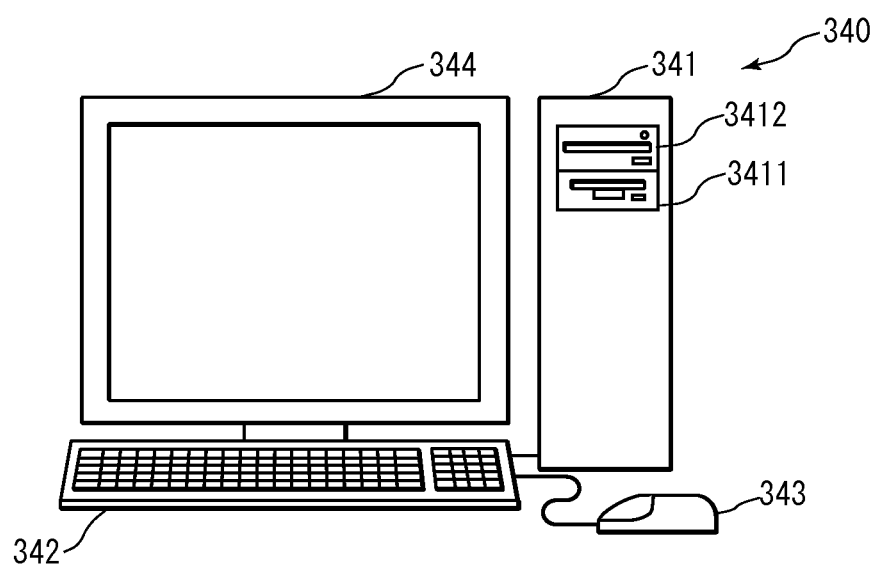
FIG. 31 is a schematic diagram of a computer system of Embodiment 1.
Figure 32:
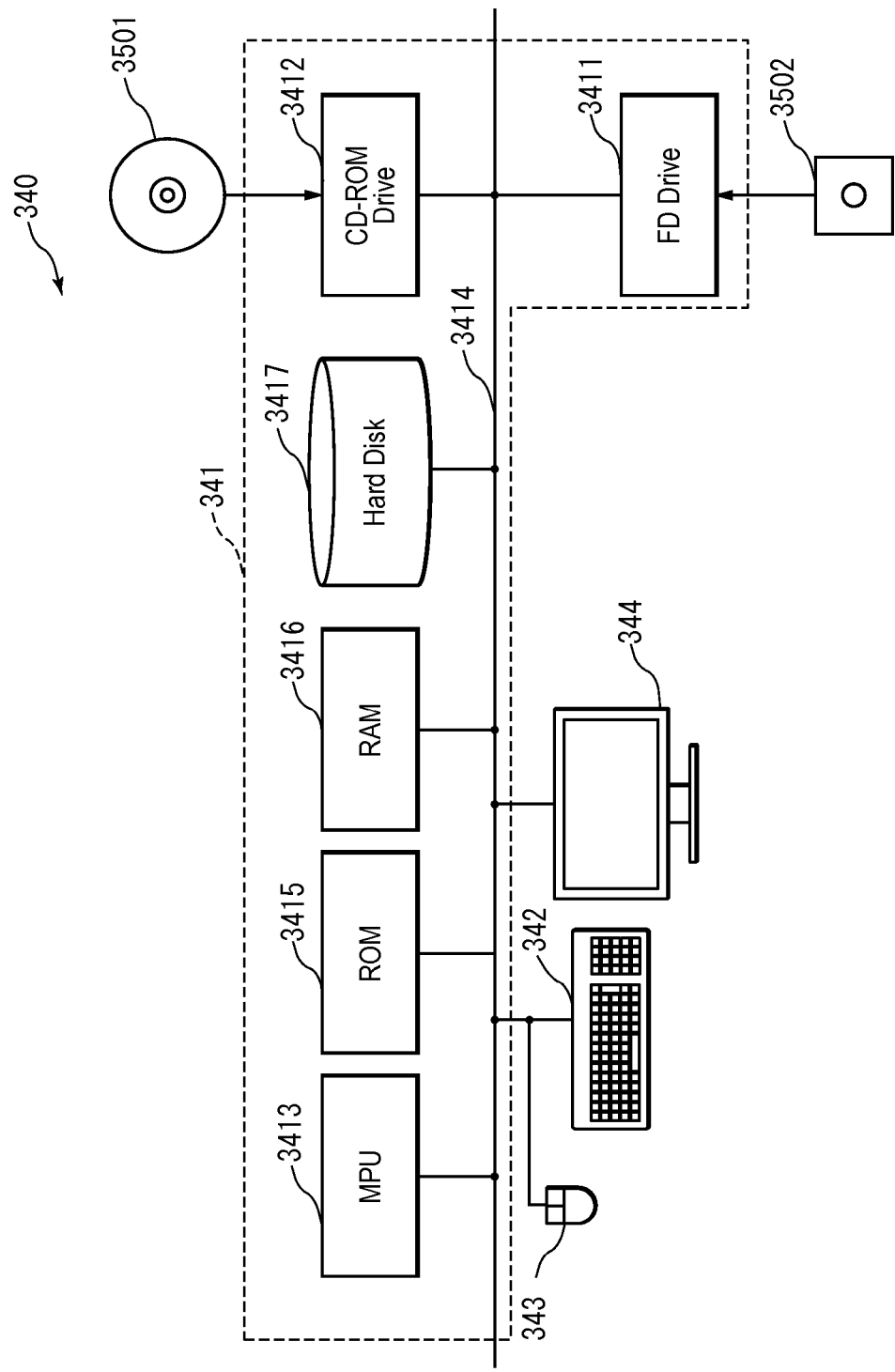
FIG. 32 is a block diagram of the computer system of Embodiment 1.
Figure 33:
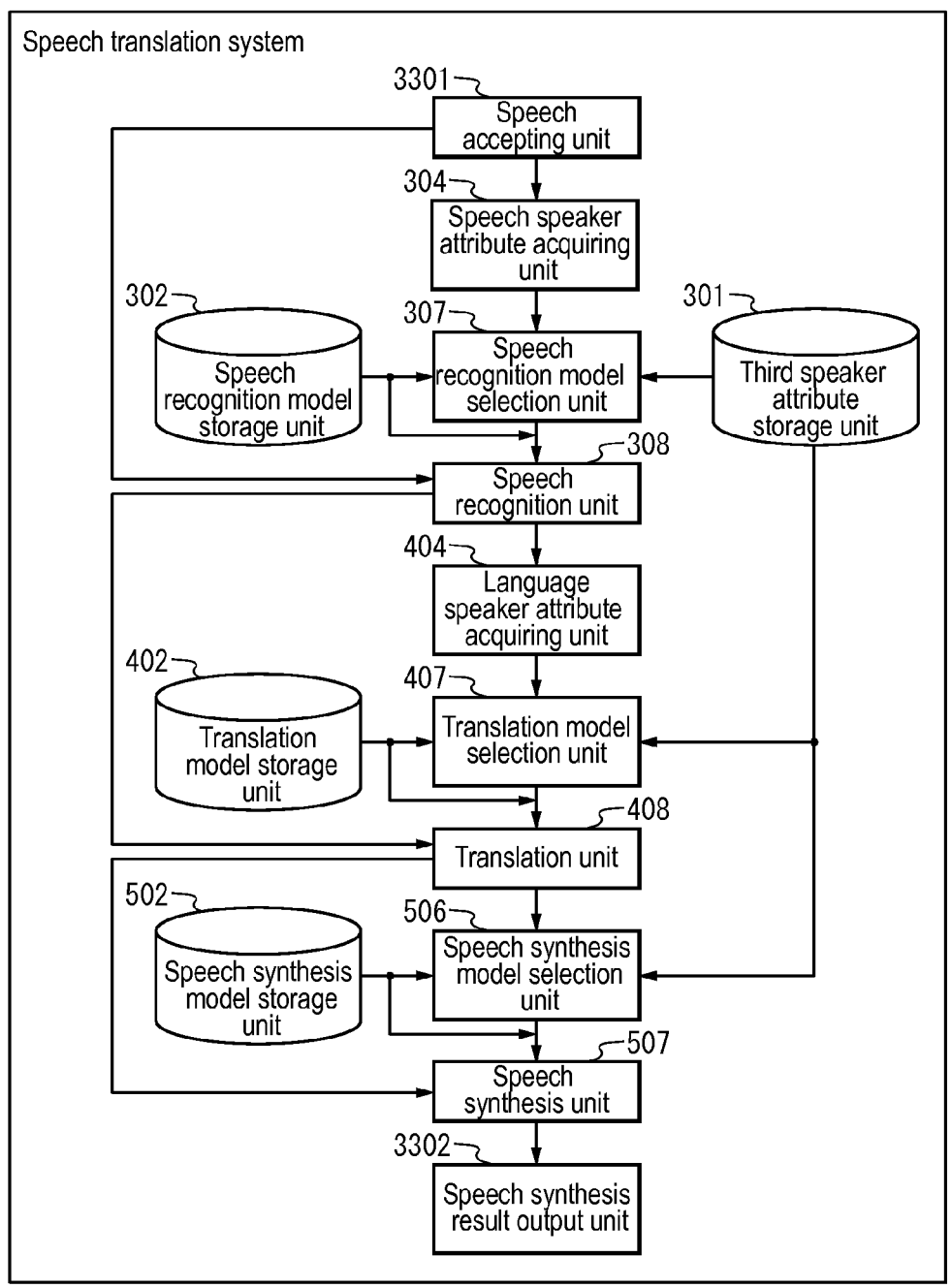
FIG. 33 is another block diagram of the speech translation system of Embodiment 1.

The invention claimed is:

1. A speech translation system including a first terminal apparatus for inputting speech, two or more speech recognition servers, one or more translation servers, and one or more speech synthesis servers, wherein the first terminal apparatus comprises:
a first speaker attribute storage unit capable of having stored therein one or more speaker attributes which are attribute values of a speaker;
a first speech accepting unit that accepts speech;
a first speech recognition server selection unit that selects a speech recognition server from among the two or more speech recognition servers in accordance with the one or more speaker attributes; and
a first speech sending unit that sends speech information constituted from the speech accepted by the first speech accepting unit to the speech recognition server selected by the first speech recognition server selection unit,
each speech recognition server comprises:
a speech recognition model storage unit capable of having stored therein a speech recognition model for all two or more languages or a part of the two or more languages;
a speech information receiving unit that receives the speech information;
a speech recognition unit that performs speech recognition on the speech information received by the speech information receiving unit by using the speech recognition model in the speech recognition model storage unit, and acquires a speech recognition result; and
a speech recognition result sending unit that sends the speech recognition result,
each translation server comprises:
a translation model storage unit capable of having stored therein a translation model for all of the two or more languages or a part of the two or more languages;
a speech recognition result receiving unit that receives the speech recognition result;
a translation unit that translates into a target language, by using the translation model in the translation model storage unit, the speech recognition result received by the speech recognition result receiving unit, and acquires a translation result; and
a translation result sending unit that sends the translation result,
each speech synthesis server comprises:
a speech synthesis model storage unit capable of having stored therein a speech synthesis model for all of the two or more languages or a part of the two or more languages;
a translation result receiving unit that receives the translation result;
a speech synthesis unit that performs, by using the speech synthesis model in the speech synthesis model storage unit, speech synthesis on the translation result received by the translation result receiving unit, and acquires a speech synthesis result; and
a speech synthesis result sending unit that sends the speech synthesis result to a second terminal apparatus; wherein
the one or more speaker attributes are selected from the group of speaker class and dynamic speaker attribute information,
wherein speaker class is determined based on one or more of degree of difficulty in used words,
information indicating a degree of politeness of used terms,
information indicating the degree of grammatical correctness, and
information indicating a multiple degree of these elements, and
information indicating whether or not the speaker is a native speaker.

2. A speech translation system including a first terminal apparatus for inputting speech, one or more speech recognition servers, one or more translation servers, and one or more speech synthesis servers, wherein the first terminal apparatus comprises:
a first speech accepting unit that accepts speech; and
a first speech sending unit that sends speech information constituted from the speech accepted by the first speech accepting unit to the speech recognition server,
each speech recognition server comprises:
a third speaker attribute storage unit capable of having stored therein one or more speaker attributes which are attribute values of a speaker;
a speech recognition model storage unit capable of having stored therein two or more speech recognition models for all two or more languages or a part of the two or more languages;
a speech information receiving unit that receives the speech information;
a speech recognition model selection unit that selects a speech recognition model from among the two or more speech recognition models in accordance with the one or more speaker attributes;
a speech recognition unit that performs, by using a speech recognition model selected by the speech recognition model selection unit, speech recognition on the speech information received by the speech information receiving unit, and acquires a speech recognition result; and
a speech recognition result sending unit that sends the speech recognition result,
each translation server comprises:
a translation model storage unit capable of having stored therein a translation model for all of the two or more languages or a part of the two or more languages;
a speech recognition result receiving unit that receives the speech recognition result;
a translation unit that translates into a target language, by using the translation model in the translation model storage unit, the speech recognition result received by the speech recognition result receiving unit, and acquires a translation result; and
a translation result sending unit that sends the translation result,
each speech synthesis server comprises:
a speech synthesis model storage unit capable of having stored therein a speech synthesis model for all of the two or more languages or a part of the two or more languages;
a translation result receiving unit that receives the translation result;
a speech synthesis unit that performs, by using the speech synthesis model in the speech synthesis model storage unit, speech synthesis on the translation result received by the translation result receiving unit, and acquires a speech synthesis result; and
a speech synthesis result sending unit that sends the speech synthesis result to a second terminal apparatus; wherein the one or more speaker attributes are selected from the group of speaker class and dynamic speaker attribute information,
wherein speaker class is determined based on one or more of degree of difficulty in used words,
information indicating a degree of politeness of used terms,
information indicating the degree of grammatical correctness, and
information indicating a multiple degree of these elements, and
information indicating whether or not the speaker is a native speaker.

3. A speech translation system including one or more speech recognition servers, two or more translation servers, and one or more speech synthesis servers,
wherein each speech recognition server comprises:
a third speaker attribute storage unit capable of having stored therein one or more speaker attributes which are attribute values of a speaker;
a speech recognition model storage unit capable of having stored therein a speech recognition model for all two or more languages or a part of the two or more languages;
a speech information receiving unit that receives speech information;
a speech recognition unit that performs, by using the speech recognition model in the speech recognition model storage unit, speech recognition on the speech information received by the speech information receiving unit, and acquires a speech recognition result;
a translation server selection unit that selects a translation server from among the two or more translation servers in accordance with the one or more speaker attributes; and
a speech recognition result sending unit that sends the speech recognition result to the translation server selected by the translation server selection unit,
each translation server comprises:
a translation model storage unit capable of having stored therein a translation model for all of the two or more languages or a part of the two or more languages;
a speech recognition result receiving unit that receives the speech recognition result;
a translation unit that translates into a target language, by using the translation model in the translation model storage unit, the speech recognition result received by the speech recognition result receiving unit, and acquires a translation result; and
a translation result sending unit that sends the translation result,
each speech synthesis server comprises:
a speech synthesis model storage unit capable of having stored therein a speech synthesis model for all of the two or more languages or a part of the two or more languages;
a translation result receiving unit that receives the translation result;
a speech synthesis unit that performs, by using the speech synthesis model in the speech synthesis model storage unit, speech synthesis on the translation result received by the translation result receiving unit, and acquires a speech synthesis result; and
a speech synthesis result sending unit that sends the speech synthesis result to a second terminal apparatus; wherein
the one or more speaker attributes are selected from the group of speaker class and dynamic speaker attribute information,
wherein speaker class is determined based on one or more of degree of difficulty in used words,
information indicating a degree of politeness of used terms,
information indicating the degree of grammatical correctness, and
information indicating a multiple degree of these elements, and
information indicating whether or not the speaker is a native speaker.

4. A speech translation system including one or more speech recognition servers, one or more translation servers, and one or more speech synthesis servers,
wherein each speech recognition server comprises:
a speech recognition model storage unit capable of having stored therein a speech recognition model for all two or more languages or a part of the two or more languages;
a speech information receiving unit that receives speech information;
a speech recognition unit that performs, by using the speech recognition model in the speech recognition model storage unit, speech recognition on the speech information received by the speech information receiving unit, and acquires a speech recognition result; and
a speech recognition result sending unit that sends the speech recognition result to the translation server,
each translation server comprises:
a translation model storage unit capable of having stored therein two or more translation models for all of the two or more languages or a part of the two or more languages;
a fourth speaker attribute storage unit capable of having stored therein one or more speaker attributes;
a speech recognition result receiving unit that receives the speech recognition result;
a translation model selection unit that selects a translation model from among the two or more translation models in accordance with the one or more speaker attributes;
a translation unit that translates into a target language, by using the translation model selected by the translation model selection unit, the speech recognition result received by the speech recognition result receiving unit, and acquires a translation result; and
a translation result sending unit that sends the translation result,
each speech synthesis server comprises:
a speech synthesis model storage unit capable of having stored therein a speech synthesis model for all of the two or more languages or a part of the two or more languages;
a translation result receiving unit that receives the translation result;
a speech synthesis unit that performs, by using the speech synthesis model in the speech synthesis model storage unit, speech synthesis on the translation result received by the translation result receiving unit, and acquires a speech synthesis result; and
a speech synthesis result sending unit that sends the speech synthesis result to a second terminal apparatus; wherein
the one or more speaker attributes are selected from the group of speaker class and dynamic speaker attribute information,
wherein speaker class is determined based on one or more of degree of difficulty in used words,
information indicating a degree of politeness of used terms, information indicating the degree of grammatical correctness, and information indicating a multiple degree of these elements, and information indicating whether or not the speaker is a native speaker.

5. A speech translation system including one or more speech recognition servers, one or more translation servers, and two or more speech synthesis servers, wherein each speech recognition server comprises:

a speech recognition model storage unit capable of having stored therein a speech recognition model for all two or more languages or a part of the two or more languages;

a speech information receiving unit that receives speech information;

a speech recognition unit that performs, by using the speech recognition model in the speech recognition model storage unit, speech recognition on the speech information received by the speech information receiving unit, and acquires a speech recognition result; and a speech recognition result sending unit that sends the speech recognition result to the translation server, each translation server comprises:

a translation model storage unit capable of having stored therein a translation model for all of the two or more languages or a part of the two or more languages;

a fourth speaker attribute storage unit capable of having stored therein one or more speaker attributes;

a speech recognition result receiving unit that receives the speech recognition result;

a translation unit that translates into a target language, by using the translation model in the translation model storage unit, the speech recognition result received by the speech recognition result receiving unit, and acquires a translation result;

a speech synthesis server selection unit that selects a speech synthesis server from among the two or more speech synthesis servers in accordance with the one or more speaker attributes; and a translation result sending unit that sends the translation result to the speech synthesis server selected by the speech synthesis server selection unit, each speech synthesis server comprises:

a speech synthesis model storage unit capable of having stored therein a speech synthesis model for all of the two or more languages or a part of the two or more languages;

a translation result receiving unit that receives the translation result;

a speech synthesis unit that performs, by using the speech synthesis model in the speech synthesis model storage unit, speech synthesis on the translation result received by the translation result receiving unit, and acquires a speech synthesis result; and a speech synthesis result sending unit that sends the speech synthesis result to a second terminal apparatus; wherein the one or more speaker attributes are selected from the group of speaker class and dynamic speaker attribute information, wherein speaker class is determined based on one or more of degree of difficulty in used words, information indicating a degree of politeness of used terms, information indicating the degree of grammatical correctness, and information indicating a multiple degree of these elements, and information indicating whether or not the speaker is a native speaker.

6. A speech translation system including one or more speech recognition servers, one or more translation servers, and one or more speech synthesis servers, wherein each speech recognition server comprises:

a speech recognition model storage unit capable of having stored therein a speech recognition model for all two or more languages or a part of the two or more languages;

a speech information receiving unit that receives speech information;

a speech recognition unit that performs, by using the speech recognition model in the speech recognition model storage unit, speech recognition on the speech information received by the speech information receiving unit, and acquires a speech recognition result; and a speech recognition result sending unit that sends the speech recognition result to the translation server, each translation server comprises:

a translation model storage unit capable of having stored therein a translation model for all of the two or more languages or a part of the two or more languages;

a speech recognition result receiving unit that receives the speech recognition result;

a translation unit that translates into a target language, by using the translation model in the translation model storage unit, the speech recognition result received by the speech recognition result receiving unit, and acquires a translation result; and a translation result sending unit that sends the translation result to the speech synthesis server, each speech synthesis server comprises:

a speech synthesis model storage unit capable of having stored therein two or more speech synthesis models for all of the two or more languages or a part of the two or more languages, a fifth speaker attribute storage unit capable of having stored therein one or more speaker attributes, a translation result receiving unit that receives the translation result;

a speech synthesis model selection unit that selects a speech synthesis model from among the two or more speech synthesis models in accordance with the one or more speaker attributes;

a speech synthesis unit that performs, by using the speech synthesis model selected by the speech synthesis model selection unit, speech synthesis on the translation result received by the translation result receiving unit, and acquires a speech synthesis result; and a speech synthesis result sending unit that sends the speech synthesis result to a second terminal apparatus; wherein the one or more speaker attributes are selected from the group of speaker class and dynamic speaker attribute information, wherein speaker class is determined based on one or more of degree of difficulty in used words, information indicating a degree of politeness of used terms, information indicating the degree of grammatical correctness, and information indicating a multiple degree of these elements, and information indicating whether or not the speaker is a native speaker.

7. The speech translation system according to claim 1, wherein the first terminal apparatus comprises:
a first speaker attribute accepting unit that accepts one or more speaker attributes; and
a first speaker attribute accumulation unit that accumulates the one or more speaker attributes in the first speaker attribute storage unit.

8. The speech translation system according to claim 2, wherein each speech recognition server further comprises:
a speech speaker attribute acquiring unit that acquires one or more speaker attributes related to speech from the speech information received by the speech information receiving unit; and
a third speaker attribute accumulation unit that accumulates, in the third speaker attribute storage unit, one or more speaker attributes acquired by the speech speaker attribute acquiring unit.

9. The speech translation system according to claim 4, wherein each translation server comprises:
a language speaker attribute acquiring unit that acquires one or more speaker attributes related to language from the speech recognition result received by the speech recognition result receiving unit; and
a fourth speaker attribute accumulation unit that accumulates, in the fourth speaker attribute storage unit, the one or more speaker attributes acquired by the language speaker attribute acquiring unit.

10. The speech translation system according to claim 1, wherein a source language identifier for identifying a source language which is a language used by the speaker, a target language identifier for identifying a target language which is a language into which translation is performed, and speech translation control information containing one or more speaker attributes are sent from the speech recognition server via the one or more translation servers to the speech synthesis server, and
the speech recognition server selection unit, the speech recognition unit, the speech recognition model selection unit, the translation server selection unit, the translation unit, or the translation model selection unit, the speech synthesis server selection unit, the speech synthesis unit, or the speech synthesis model selection unit performs respective processing by using the speech translation control information.

11. The first terminal apparatus that constitutes the speech translation system according to claim 1.

12. The speech recognition server that constitutes the speech translation system according to claim 2.

13. The translation server that constitutes the speech translation system according to claim 4.

14. The speech synthesis server that constitutes the speech translation system according to claim 6.

* * * * *